US010236935B2

United States Patent
Chen et al.

(10) Patent No.: US 10,236,935 B2
(45) Date of Patent: Mar. 19, 2019

(54) CAPACITIVE TOUCH DEVICE AND MOUSE FOR NEAR FIELD COMMUNICATION

(71) Applicant: PixArt Imaging Inc., Hsin-Chu County (TW)

(72) Inventors: Yung-Wei Chen, Hsin-Chu County (TW); Yen-Chang Wang, Hsin-Chu County (TW); Yen-Min Chang, Hsin-Chu County (TW); Hsin-Chia Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 24 days.

(21) Appl. No.: 15/677,580

(22) Filed: Aug. 15, 2017

(65) Prior Publication Data

US 2017/0346529 A1    Nov. 30, 2017

Related U.S. Application Data

(63) Continuation of application No. 15/176,634, filed on Jun. 8, 2016, now Pat. No. 9,800,292, which is a continuation-in-part of application No. 14/565,622, filed on Dec. 10, 2014, now Pat. No. 9,389,742.

(51) Int. Cl.
  *H04B 5/00*     (2006.01)
  *G06F 3/044*    (2006.01)
  *G06F 3/041*    (2006.01)

(52) U.S. Cl.
  CPC .......... *H04B 5/0012* (2013.01); *G06F 3/044* (2013.01); *G06F 3/0416* (2013.01)

(58) Field of Classification Search
  CPC ...... G06F 3/0416; G06F 3/044; H04B 5/0012
  See application file for complete search history.

(56) References Cited

U.S. PATENT DOCUMENTS

| | | | |
|---|---|---|---|
| 6,452,514 | B1 | 9/2002 | Philipp |
| 8,232,977 | B2 | 7/2012 | Zachut et al. |
| 8,633,715 | B2 | 1/2014 | Lenz |
| 8,810,537 | B2 | 8/2014 | Yousefpor et al. |
| 8,854,925 | B1 | 10/2014 | Lee et al. |
| 8,982,091 | B1 | 3/2015 | Mohindra |
| 9,013,429 | B1 | 4/2015 | Krekhovetskyy et al. |
| 2007/0109274 | A1 | 5/2007 | Reynolds |
| 2010/0013773 | A1 | 1/2010 | Ku |
| 2010/0060593 | A1 | 3/2010 | Krah |
| 2010/0096193 | A1 | 4/2010 | Yilmaz et al. |
| 2011/0063103 | A1 | 3/2011 | Lee et al. |
| 2011/0074732 | A1 | 3/2011 | Reynolds |
| 2013/0147760 | A1 | 6/2013 | Lai et al. |
| 2013/0231046 | A1 | 9/2013 | Pope et al. |

(Continued)

*Primary Examiner* — Xin Jia

(74) *Attorney, Agent, or Firm* — Hauptman Ham, LLP

(57) ABSTRACT

There is provided a capacitive communication system including an object and a capacitive touch panel. The object includes a plurality of induction conductors configured to have different potential distributions at different time intervals by modulating respective potentials thereof. The capacitive touch panel includes a plurality of sensing electrodes configured to form a coupling electric field with the induction conductors to detect the different potential distributions at the different time intervals. When the different potential distributions match a predetermined agreement between the object and the capacitive touch panel, a near field communication is formed between the object and the capacitive touch panel.

16 Claims, 16 Drawing Sheets

(56) References Cited

U.S. PATENT DOCUMENTS

| | | |
|---|---|---|
| 2014/0171055 A1 | 6/2014 | Oshita |
| 2014/0204046 A1 | 6/2014 | Hsu et al. |
| 2014/0204053 A1 | 7/2014 | Crandall |
| 2014/0243046 A1 | 8/2014 | Steely et al. |
| 2015/0193335 A1 | 7/2015 | Woo et al. |
| 2015/0199941 A1 | 7/2015 | Reunamaki et al. |
| 2015/0268758 A1 | 9/2015 | Lo et al. |
| 2015/0286335 A1 | 10/2015 | Haga et al. |
| 2015/0339524 A1 | 11/2015 | Yang et al. |
| 2015/0351681 A1 | 12/2015 | Lee et al. |
| 2016/0034887 A1 | 2/2016 | Lee |
| 2016/0039424 A1 | 2/2016 | Hong et al. |
| 2016/0046285 A1 | 2/2016 | Kim et al. |
| 2016/0070385 A1 | 3/2016 | Fang et al. |
| 2016/0285514 A1 | 9/2016 | Chen et al. |

CAPACITIVE TOUCH DEVICE AND MOUSE FOR NEAR FIELD COMMUNICATION

CROSS REFERENCE TO RELATED APPLICATION

This application is a continuation application of U.S. application Ser. No. 15/176,634, filed Jun. 8, 2016, which is a continuation-in-part application of U.S. application Ser. No. 14/565,622, filed Dec. 10, 2014, the full disclosure of which is incorporated herein by reference.

BACKGROUND

1. Field of the Disclosure

This disclosure generally relates to an interactive input device and, more particularly, to a capacitive touch device, a capacitive communication device and a communication system.

2. Description of the Related Art

Capacitive sensors generally include a pair of electrodes configured to sense a finger. When a finger is present, the amount of charge transferring between the pair of electrodes can be changed so that it is able to detect whether the finger is present or not according to a voltage variation. It is able to form a sensing matrix by arranging a plurality of electrode pairs in matrix.

FIGS. 1A and 1B are schematic diagrams of a conventional capacitive sensor which includes a first electrode 91, a second electrode 92, a drive circuit 93 and a detection circuit 94. The drive circuit 93 is configured to input a drive signal to the first electrode 91. Electric field can be formed between the first electrode 91 and the second electrode 92 so as to transfer charges to the second electrode 92. The detection circuit 94 is configured to detect the amount of charges transferred to the second electrode 92.

When a finger is present, e.g. shown by an equivalent circuit 8, the finger may disturb the electric field between the first electrode 91 and the second electrode 92 so that the amount of transferred charges is reduced. The detection circuit 94 can detect a voltage variation to accordingly identify the presence of the finger.

In addition, when another capacitive sensor approaches, the electric field between the first electrode 91 and the second electrode 92 is also changed thereby changing the amount of transferred charges. The detection circuit 94 is also able to detect a voltage variation to accordingly identify the presence of said another capacitive sensor.

SUMMARY

Accordingly, the present disclosure provides a capacitive touch device, a capacitive communication device and a communication system capable of detecting the touch event as well as performing the near field communication.

The present disclosure provides a capacitive touch device, a capacitive communication device and a communication system that may identify the touch event according to the variation of a norm of vector of two detection components and perform the near field communication according to the phase variation of detection signals.

The present disclosure further provides a capacitive touch device, a capacitive communication device and a communication system that have a longer transmission distance.

The present disclosure further provides a capacitive communication system which identifies different objects and communicates data with the objects using the near field communication.

The present disclosure further provides a Bluetooth pairing method which has a simplified triggering procedure.

The present disclosure provides a capacitive communication system including an object and a capacitive touch panel. The object includes at least one induction conductor and a controller. The controller is coupled to the at least one induction conductor and configured to modulate a potential of the at least one induction conductor to be configured as identification data. The capacitive touch panel includes at least one sensing electrode and a processing unit. The at least one sensing electrode is configured to form a coupling electric field with the at least one induction conductor, wherein the sensing electrode is configured to output a detection signal corresponding to the identification data according to the coupling electric field. The processing unit is configured to identify whether the object is a specific object according to the detection signal.

The present disclosure further provides a Bluetooth pairing method adapted to a Bluetooth pairing procedure between a master device including a capacitive touch panel and a slave device including at least one induction conductor. The Bluetooth pairing method includes the steps of: detecting, by the capacitive touch panel, the at least one induction conductor; identifying, by the master device, an arrangement characteristic of the at least one induction conductor when the capacitive touch panel senses the at least one induction conductor; and performing the Bluetooth pairing procedure when the master device identifies the arrangement characteristic matching a predetermined agreement.

The present disclosure further provides a capacitive communication system including an object and a capacitive touch panel. The object includes a plurality of induction conductors configured to have different potential distributions at different time intervals by modulating respective potentials on the induction conductors. The capacitive touch panel includes a plurality of sensing electrodes configured to form a coupling electric field with the induction conductors to detect the different potential distributions at the different time intervals, wherein when the differential potential distributions match a predetermined agreement, a near field communication between the capacitive touch panel and the object is formed.

In the capacitive touch device, capacitive communication device and communication system according to some embodiments of the present disclosure, the phase-modulated drive signal may be a phase-shift keying (PSK) signal or a differential phase shift keying (DPSK) signal. The PSK signal may be a biphase shift keying (BPSK) signal, a quadrature phase shift keying (QPSK) signal, an 8-PSK signal or a 16-PSK signal. The DPSK signal may be a differential BPSK (DBPSK) signal, a differential QPSK (DQPSK) signal, a differential 8PSK (D-8PSK) signal or a differential 16PSK (D-16PSK) signal.

In the present disclosure, the capacitive touch panel is a self-capacitive touch panel or a mutual-capacitive touch panel.

In the present disclosure, the object is, for example, an electronic lock, a mouse device, an earphone, a watch, a bracelet, a smart pen, a doll or an electronic mobile device having another capacitive touch panel.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
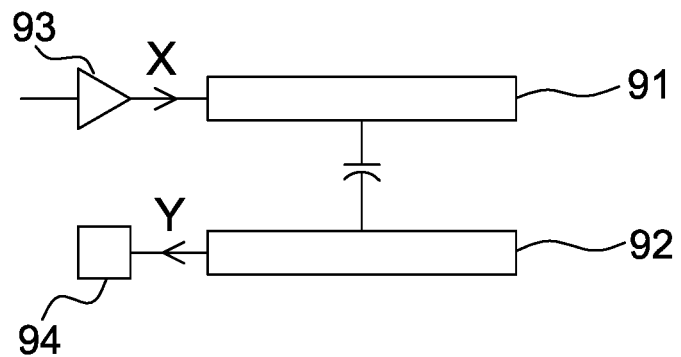
FIGS. 1A-1B are schematic block diagrams of the conventional capacitive sensor.
Figure 1B:
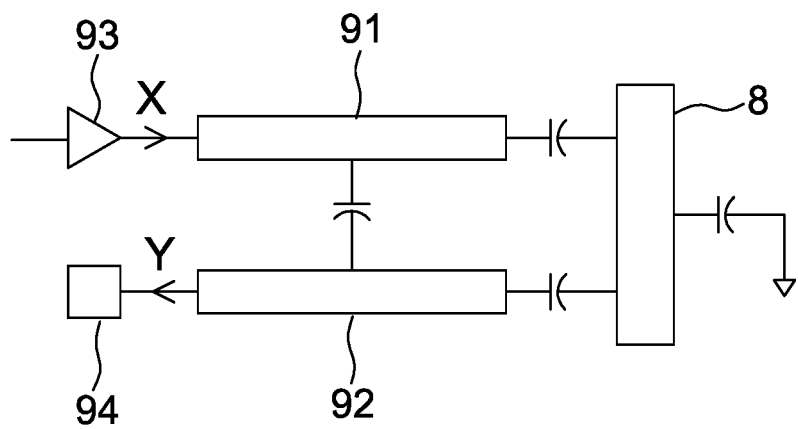
Figure 2:
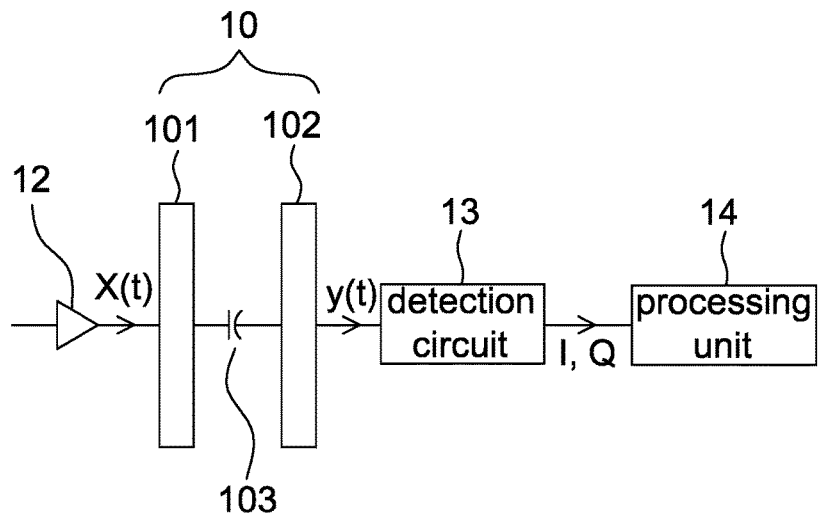
FIG. 2 is a schematic diagram of the capacitive touch sensing device according to one embodiment of the present disclosure.

Referring to FIG. 2, it shows a schematic diagram of the capacitive touch sensing device according to an embodiment of the present disclosure. The capacitive touch sensing device of this embodiment includes a sensing element 10, a drive unit 12, a detection circuit 13 and a processing unit 14. The capacitive touch sensing device is configured to detect whether an object (e.g. a finger or a metal plate, but not limited to) approaches the sensing element 10 according to the change of the amount of charges on the sensing element 10.

The sensing element 10 includes a first electrode 101 (e.g. a drive electrode) and a second electrode 102 (e.g. a receiving electrode), and electric field can be produced to form a coupling capacitance 103 between the first electrode 101 and the second electrode 102 when a voltage signal is inputted to the first electrode 101. The first electrode 101 and the second electrode 102 may be arranged properly without any limitation as long as the coupling capacitance 103 can be formed (e.g. via a dielectric layer), wherein principles of forming the electric field and the coupling capacitance 103 between the first electrode 101 and the second electrode 102 is well known and thus are not described herein. The present disclosure is to eliminate the interference on detecting results due to the phase shift caused by the capacitance on signal lines.

The drive unit 12 may be a signal generator and configured to input a drive signal x(t) to the first electrode 101 of the sensing element 10. The drive signal x(t) may be a time-varying signal, such as a periodic signal. In other embodiments, the drive signal x(t) may be a meander signal (e.g. a sinusoidal signal) or a pulse signal (e.g. a square wave), but not limited thereto. The drive signal x(t) may couple a detection signal y(t) on the second electrode 102 through the coupling capacitance 103.

The detection circuit 13 is coupled to the second electrode 102 of the sensing element 10 and configured to detect the detection signal y(t) and to modulate the detection signal y(t) respectively with two signals so as to generate a pair of modulated detection signals, which are served as two components I and Q of a two-dimensional detection vector. The two signals may be continuous signals or vectors that are orthogonal or non-orthogonal to each other. In one aspect, the two signals include a sine signal and a cosine signal, i.e. the two signals preferably have different phases.

The processing unit 14 is configured to calculate an amplitude of the pair of the modulated detection signals, which is served as a norm of vector of the two-dimensional detection vector (I,Q), and to compare the norm of vector with a threshold TH so as to identify a touch event. In one aspect, the processing unit 14 may calculate the norm of vector $R=\sqrt{I^2+Q^2}$ by using software. In other aspect, the processing unit 14 may calculate by hardware or firmware, such as using the CORDIC (coordinate rotation digital computer) shown in FIG. 4 to calculate the norm of vector $R=\sqrt{i^2+q^2}$, wherein the CORDIC is a well known fast algorithm. For example, when there is no object closing to the sensing element 10, the norm of vector calculated by the processing unit 14 is assumed to be R; and when an object is present nearby the sensing element 10, the norm of vector is decreased to R'. When the norm of vector R' is smaller than the threshold TH, the processing unit 14 may identify that the object is present close to the sensing element 10 and induces a touch event. It should be mentioned that when another object, such as a metal plate, approaches the sensing element 10, the norm of vector R may be increased. Therefore, the processing unit 14 may identify a touch event occurring when the norm of vector becomes larger than a predetermined threshold.

In another embodiment, the processing unit 14 may perform coding on the two components I and Q of the two-dimensional detection vector by using quadrature amplitude-shift keying (QASK), such as 16-QASK. A part of the codes may be corresponded to the touch event and the other part of the codes may be corresponded to non-touch state and these codes are previously saved in the processing unit 14. When the processing unit 14 calculates the QASK code of two current components I and Q according to the pair of the modulated detection signals, it is able to identify that whether an object is present near the sensing element 10.

Figure 3A:
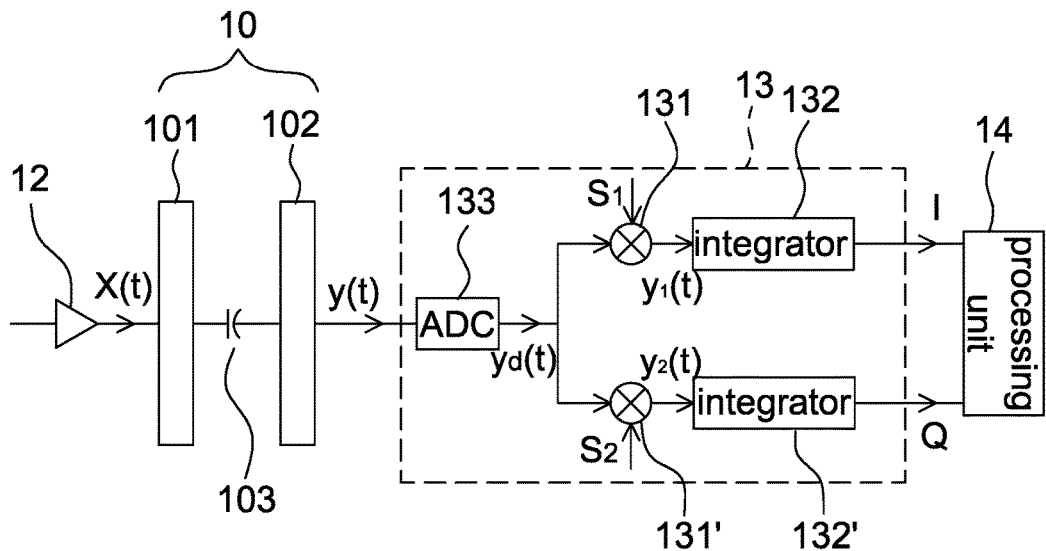
FIGS. 3A-3B are other schematic diagrams of the capacitive touch sensing device according to some embodiments of the present disclosure.
Figure 3B:
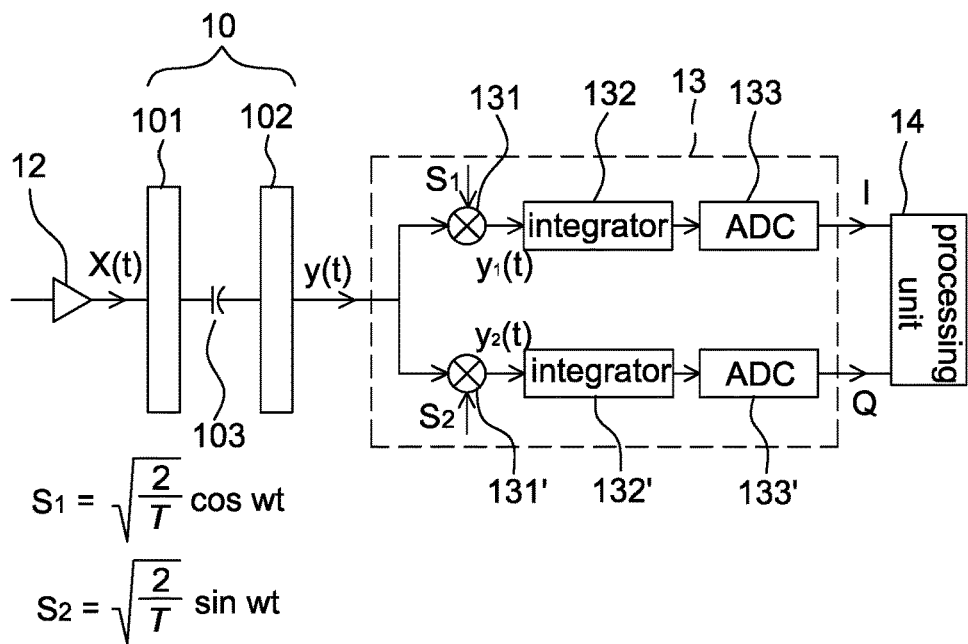

FIGS. 3A and 3B respectively show another schematic diagram of the capacitive touch sensing device according to an embodiment of the present disclosure in which embodiments of the detection circuit 13 are shown.

In FIG. 3A, the detection circuit 13 includes two multipliers 131 and 131', two integrators 132 and 132', an analog-to-digital converter (ADC) 133, and is configured to process the detection signal y(t) so as to generate a two-dimensional detection vector (I,Q). The ADC converter 133 is configured to digitize the detection signal y(t) to generate a digitized detection signal $y_d(t)$. The two multipliers 131 and 131' are indicated to modulate two signals $S_1$ and $S_2$ with the digitized detection signal $y_d(t)$ so as to generate a pair of modulated detection signals $y_1(t)$ and $y_2(t)$. In order to sample the pair of modulated detection signals $y_1(t)$ and $y_2(t)$, two integrators 132 and 132' are configured to integrate the pair of modulated detection signals $y_1(t)$ and $y_2(t)$ so as to generate two digital components I and Q of the two-dimensional detection vector (I,Q). In this embodiment, the two integrators 132 and 132' may be any proper integration circuit, such as the capacitor.

In FIG. 3B, the detection circuit 13 includes two multipliers 131 and 131', two integrators 132 and 132', two analog-to-digital converters (ADC) 133 and 133' configured to process the detection signal y(t) so as to generate a two-dimensional detection vector (I,Q). The two multipliers 131 and 131' are indicated to modulate two signals, such as $S_1=\sqrt{2/T} \cos(\omega t)$ and $S_2=\sqrt{2/T} \sin(\omega t)$ herein, with the detection signal y(t) so as to generate a pair of modulated detection signals $y_1(t)$ and $y_2(t)$. In order to sample the pair of modulated detection signals $y_1(t)$ and $y_2(t)$, two integrators 132 and 132' are configured to integrate the pair of modulated detection signals $y_1(t)$ and $y_2(t)$. In this embodiment, the two integrators 132 and 132' may be any proper integration circuit, such as the capacitor. The two ADC 133 and 133' are configured to digitize the pair of modulated detection signals $y_1(t)$ and $y_2(t)$ being integrated so as to generate two digital components I and Q of the two-dimensional detection vector (I,Q). It is appreciated that the two ADC 133 and 133' start to acquire digital data when voltages on the two integrators 132 and 132' are stable.

In addition to the two continuous signals mentioned above may be used as the two signals, the two signals may also be two vectors, for example $S_1=[1\ 0\ -1\ 0]$ and $S_2=[0\ -1\ 0\ 1]$ so as to simplify the circuit structure. The two signals may be proper simplified vectors without any limitation as long as the used vectors may simplify the processes of modulation and demodulation.

As mentioned above, the detection method of the capacitive touch sensing device of the present disclosure includes the steps of: inputting a drive signal to a first electrode of a sensing element; modulating a detection signal coupled to a second electrode from the drive signal through a coupling capacitance respectively with two signals so as to generate a pair of modulated detection signals; and calculating a scale of the pair of modulated detection signals to accordingly identify a touch event.

Referring to FIG. 3A for example, the drive unit 12 inputs a drive signal x(t) to the first electrode 101 of the sensing element 10, and the drive signal x(t) may couple a detection signal y(t) on the second electrode 102 of the sensing element 10 through the coupling capacitance 103. Next, the ADC 133 digitizes the detection signal y(t) to generate a digitized detection signal $y_d(t)$. The detection circuit 13 respectively modulates the detection signal y(t) with two signals $S_1$ and $S_2$ to generate a pair of modulated detection signals $y_1(t)$ and $y_2(t)$, wherein the two signals may be two vectors $S_1=[1\ 0\ -1\ 0]$ and $S_2=[0\ -1\ 0\ 1]$ herein. The processing unit 14 calculates a scale of the pair of modulated detection signals $y_1(t)$ and $y_2(t)$ to accordingly identify a touch event, wherein the method of calculating the scale of the pair of modulated detection signals $y_1(t)$ and $y_2(t)$ may be referred to FIG. 4 and its corresponding descriptions. In addition, before calculating the scale of the pair of modulated detection signals $y_1(t)$ and $y_2(t)$, the integrator 132 and/or 132' may be used to integrate the pair of modulated detection signals $y_1(t)$ and $y_2(t)$ and then output the two digital components I and Q of the two-dimensional detection vector (I,Q).

Referring to FIG. 3B for example, the drive unit 12 inputs a drive signal x(t) to the first electrode 101 of the sensing element 10, and the drive signal x(t) may couple a detection signal y(t) on the second electrode 102 of the sensing element 10 through the coupling capacitance 103. Next, the detection circuit 13 respectively modulates the detection signal y(t) with two signals $S_1$ and $S_2$ to generate a pair of modulated detection signals $y_1(t)$ and $y_2(t)$. The processing unit 14 calculates a scale of the pair of modulated detection signals $y_1(t)$ and $y_2(t)$ to accordingly identify a touch event, wherein the method of calculating the scale of the pair of modulated detection signals $y_1(t)$ and $y_2(t)$ may be referred to FIG. 4 and its corresponding descriptions. In addition, before calculating the scale of the pair of modulated detection signals $y_1(t)$ and $y_2(t)$, the integrator 132 and/or 132' may be used to integrate the pair of modulated detection signals $y_1(t)$ and $y_2(t)$ and then the ADC 133 and/or 133' may be used perform the digitization so as to output the two digital components I and Q of the two-dimensional detection vector (I,Q).

Figure 5:
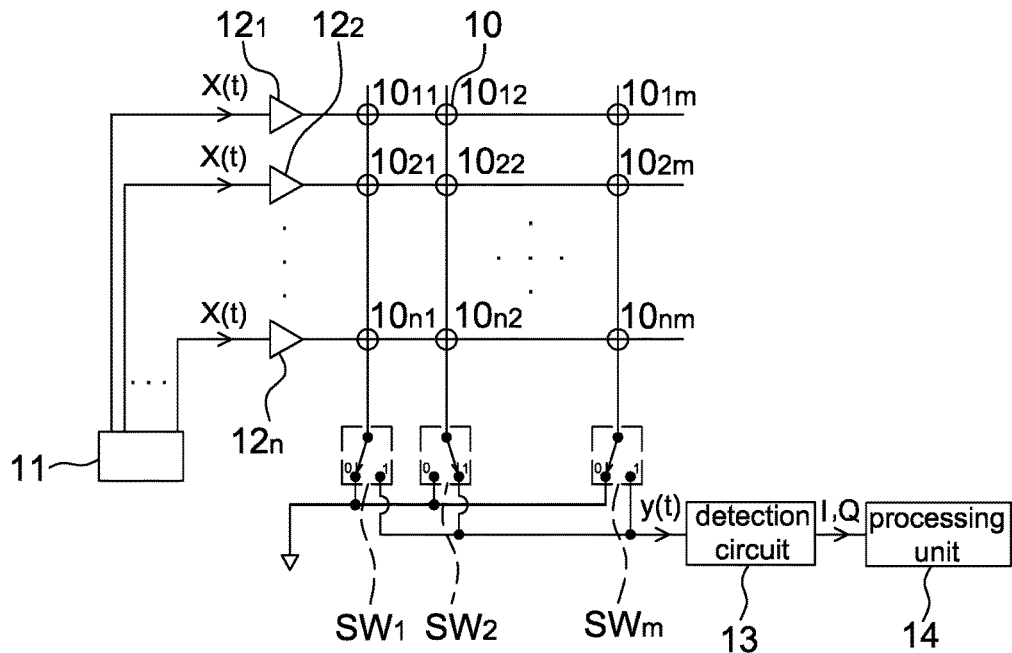
FIG. 5 is a schematic diagram of the capacitive touch sensing device according to another embodiment of the present disclosure.

Referring to FIG. 5, it shows a schematic diagram according to another embodiment of the present disclosure. A plurality of sensing elements 10 arranged in matrix may form a capacitive sensing matrix in which every row of the sensing elements 10 is driven by one of the drive units $12_1$-$12_n$ and the detection circuit 13 detects output signals of every column of the sensing elements 10 through one of the switch devices $SW_1$-$SW_m$. As shown in FIG. 5, the drive unit $12_1$ is configured to drive the first row of sensing elements $10_{11}$-$10_{1m}$ the drive unit $12_2$ is configured to drive the second row of sensing elements $10_{21}$-$10_{2m}$; . . . ; and the drive unit $12_n$ is configured to drive the nth row of sensing elements $10_{n1}$-$10_{nm}$; wherein, n and m are positive integers and the value thereof may be determined according to the size and resolution of the capacitive sensing matrix without any limitation.

In this embodiment, each of the sensing elements 10 (shown by circles herein) include a first electrode and a second electrode configured to form a coupling capacitance therebetween as shown in FIGS. 2, 3A and 3B. The drive units $12_1$-$12_n$ are respectively coupled to the first electrode of a row of the sensing elements 10. A timing controller 11 is configured to control the drive units $12_1$-$12_n$ to sequentially output a drive signal x(t) to the first electrode of the sensing elements 10.

The detection circuit 13 is coupled to the second electrode of a column of the sensing elements 10 through a plurality of switch devices $SW_1$-$SW_m$ to sequentially detect a detection signal y(t) coupled to the second electrode from the drive signal x(t) through the coupling capacitance of the sensing elements 10. The detection circuit 13 utilizes two signals to respectively modulate the detection signal y(t) to generate a pair of modulated detection signals, wherein details of generating the pair of modulated detection signals has been described in FIGS. 3A, 3B and their corresponding descriptions and thus are not repeated herein.

Figure 4:
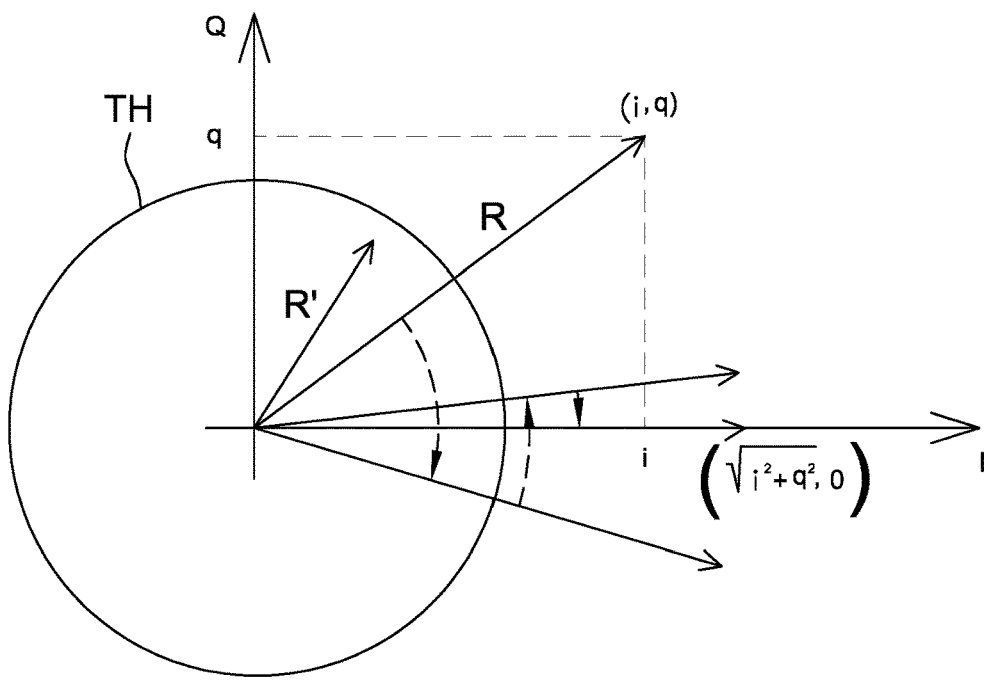
FIG. 4 is a schematic diagram of the norm of vector and the threshold used in the capacitive touch sensing device according to one embodiment of the present disclosure.

The processing unit 14 identifies a touch event and a touch position according to the pair of modulated detection signals. As mentioned above, the processing unit 14 may calculate a norm of vector of a two-dimensional detection vector of the pair of modulated detection signals and identifies the touch event when the norm of vector is larger than or equal to, or smaller than or equal to a threshold TH as shown in FIG. 4.

In this embodiment, when the timing controller 11 controls the drive unit $12_1$ to output the drive signal x(t) to the first row of the sensing elements $10_{11}$-$10_{1m}$, the switch devices $SW_1$-$SW_m$ are sequentially turned on such that the detection circuit 13 may detect the detection signal y(t) sequentially outputted by each sensing element of the first row of the sensing elements $10_{11}$-$10_{1m}$. Next, the timing controller 11 sequentially controls other drive units $12_2$-$12_n$ to output the drive signal x(t) to every row of the sensing elements. When the detection circuit 13 detects all of the sensing elements once, a scan period is accomplished. The processing unit 14 identifies the position of the sensing elements that the touch event occurs as the touch position. It is appreciated that said touch position may be occurred on more than one sensing elements 10 and the processing unit 14 may take all positions of a plurality of sensing elements 10 as touch positions or take one of the positions (e.g. the center or gravity center) of a plurality of sensing elements 10 as the touch position.

Figure 6:
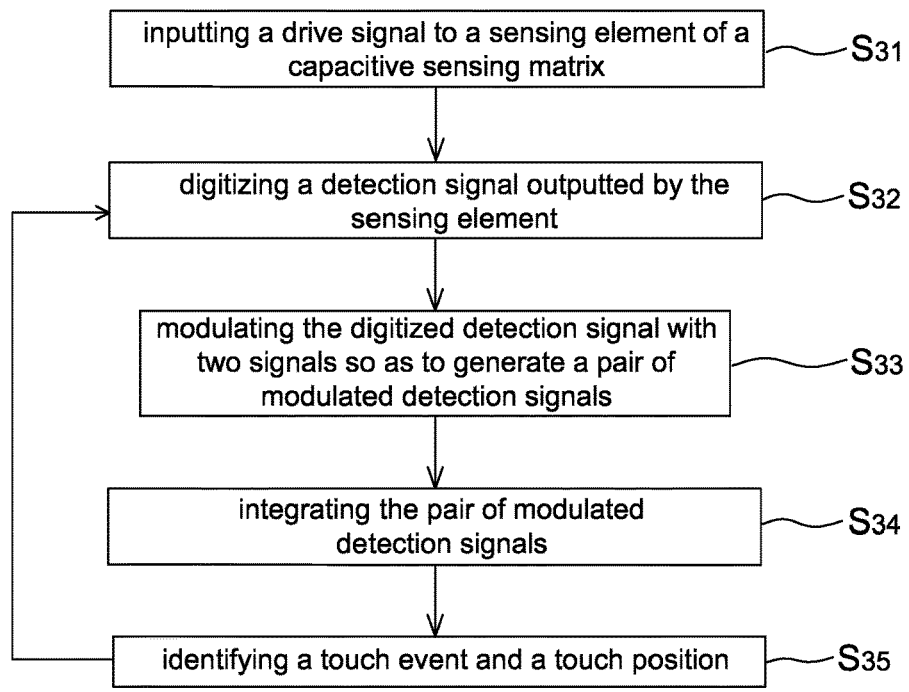
FIG. 6 is a flow chart of the operation of the capacitive touch sensing device shown in FIG. 5.

Referring to FIG. 6, it shows a flow chart of the operation of the capacitive sensing device shown in FIG. 5, which includes the steps of: inputting a drive signal to a sensing element of a capacitive sensing matrix (Step $S_{31}$); digitizing a detection signal outputted by the sensing element (Step $S_{32}$); respectively modulating the digitized detection signal with two signals so as to generate a pair of modulated detection signals (Step $S_{33}$); integrating the pair of modulated detection signals (Step $S_{34}$); and identifying a touch event and a touch position (Step $S_{35}$). Details of the operation of this embodiment have been described in FIG. 5 and its corresponding descriptions and thus are not repeated herein.

In another aspect, in order to save the power consumption of the capacitive touch sensing device shown in FIG. 5, the timing controller 11 may control more than one drive units $12_1$-$12_n$ to simultaneously output the drive signal x(t) to the associated row of the sensing elements. The detection unit 13 respectively modulates the detection signal y(t) of each row with different two continuous signals $S_1$ and $S_2$ for distinguishing. In addition, the method of identifying the touch event and the touch position are similar to FIG. 5 and thus details thereof are not repeated herein.

In the embodiment of the present disclosure, the detection circuit 13 may further include the filter and/or the amplifier to improve the signal quality. In addition, the processing unit 14 may be integrated with the detection circuit 13.

In the above embodiments, as the phase variation of transmitting signals due to the signal line does not influence the norm of vector of two detection components I, Q of the detection signal y(t), i.e. the above digital components, the influence of the phase difference due to the signal line is eliminated by modulating the detection signal y(t) with two signals in the receiving end. Similarly, if the drive signal itself or the inductive signal from an external device have phase variations, as mentioned above the phase variations in the drive signal or the external inductive signal do not influence the norm of vector of the two detection components of the detection signal so that the identification of the touch event is not affected. Accordingly, in the present disclosure a near field communication is performed based on the phase modulation so as to implement the capacitive touch device, the capacitive communication device and the communication system have both functions of the touch identification and the near field communication.

Figure 7:
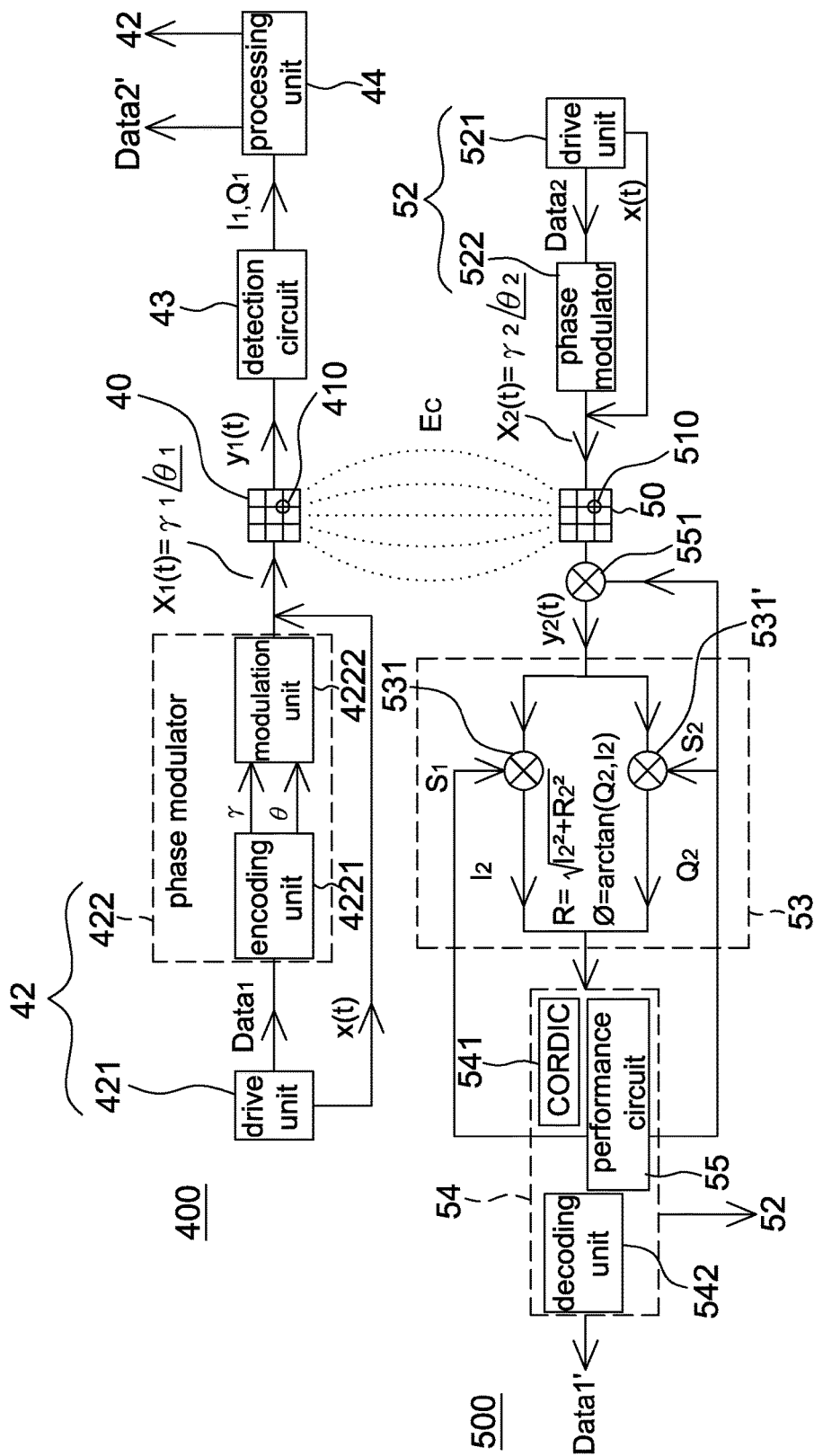
FIG. 7 is a schematic block diagram of a communication system according to one embodiment of the present disclosure.

Referring to FIG. 7, it is a schematic diagram of a communication system according to one embodiment of the present disclosure, which includes a first capacitive touch device 400 and a second capacitive touch device 500. In one embodiment, the first capacitive touch device 400 and the second capacitive touch device 500 are respectively applied to a portable electronic device such as a smart phone, a smart watch, a tablet computer, a personal digital assistance or the like, or applied to a wearable electronic device, and configured to perform a near field communication through the induced electric field coupled between two devices. In another embodiment, one of the first capacitive touch device 400 and the second capacitive touch device 500 is applied to a portable electronic device or a wearable electronic device, and the other one is applied to a home appliance, a security system, an automatic system, a vehicle electronic device or the like, and configured to access relative information of the electronic device or perform a relative control.

The first capacitive touch device 400 includes a touch panel 40, a plurality of drive circuits 42 (only one being shown for simplification), a detection circuit 43 and a processing unit 44. The second capacitive touch device 500 includes a touch panel 50, a plurality of drive circuits 52 (only one being shown for simplification), a detection circuit 53 and a processing unit 54. In this embodiment, a near field communication is implemented through the coupling electric field Ec between the touch panel 40 and the touch panel 50. In other words, the touch panel 50 is an external touch panel with respect to the first capacitive touch device 400, and the touch panel 40 is an external touch panel with respect to the second capacitive touch device 500.

Figure 8:
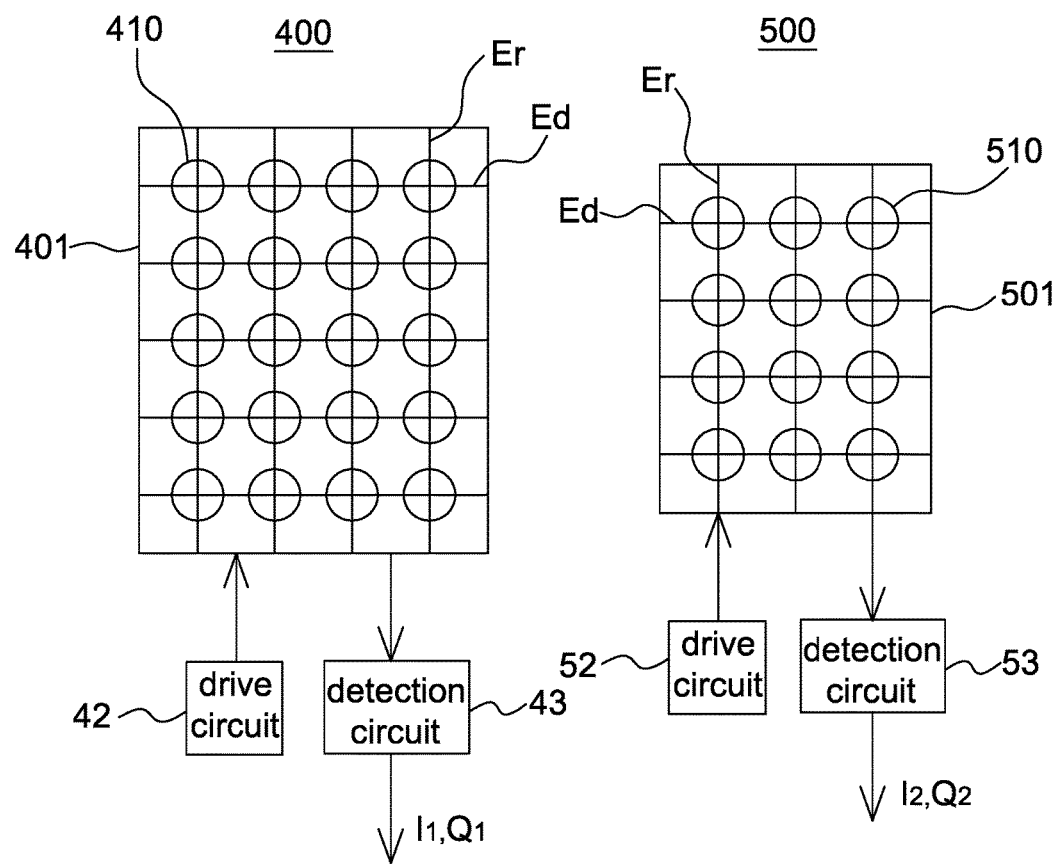
FIG. 8 is another schematic block diagram of a communication system according to one embodiment of the present disclosure.

The touch panel 40 includes a plurality of drive electrodes Ed and a plurality of receiving electrodes Er (referring to FIG. 8 for example). As mentioned above, the drive electrodes Ed and the receiving electrodes Er form sensing elements 410 therebetween so as to detect an approaching conductor. As shown in FIG. 8, a touch sensing area 401 of the touch panel 40 includes a plurality of sensing elements 410. When an external touch panel (e.g. the touch panel 50 herein) approaches, the drive electrodes Ed and the receiving electrodes Er further form a coupling electric field Ec with the external touch panel. More specifically, the drive electrodes Ed of the touch panel 40 is configured to form the coupling electric field Ec with at least one receiving electrode of the external touch panel, or the receiving electrodes Er of the touch panel 40 is configured to form the coupling electric field Ec with at least one drive electrode of the external touch panel depending on the function of the touch panel 40, e.g. a transmitting end, a receiving end or a transceiver. Similarly, the touch panel 50 includes a plurality of drive electrodes Ed and a plurality of receiving electrodes Er configured to form a coupling electric field Ec with an external touch panel (e.g. the touch panel 40 herein). As shown in FIG. 8, a touch sensing area 501 of the touch panel 50 includes a plurality of sensing elements 510. It is appreciated that the touch sensing area 401 and the touch sensing area 501 may or may not have identical resolution.

The drive circuits 42 are respectively coupled to the drive electrodes Ed (referring to FIG. 5 for example) of the touch panel 40 and respectively include a drive unit 421 and a phase modulation unit 422. The drive unit 421 outputs a phase-fixed drive signal x(t) or transmission data Data1, wherein the phase-fixed drive signal x(t) may be the drive signal in a touch detection mode, and the transmission data Data1 is for being sent to an external touch panel in a near field communication mode. The phase-fixed drive signal x(t) may be a continuous or non-continuous signal such as a square wave, sinusoidal wave, triangular wave, trapezoidal wave without particular limitations. In one embodiment, the drive circuits 42 are respectively coupled to the drive electrodes Ed through, for example, a plurality of switching elements (not shown).

The phase modulation unit 422 includes an encoding unit 4221 and a modulation unit 4222. The encoding unit 4221 is configured to encode the transmission data Data1, and the modulation unit 4222 is configured to phase-modulate the encoded transmission data and output the phase-modulated drive signal $X_1(t)=r_1\angle\theta_1$. In one embodiment, the phase-modulated drive signal $X_1(t)$ may be a phase-shift keying (PSK) signal, wherein the PSK signal may be a biphase shift keying (BPSK) signal, a quadrature phase shift keying (QPSK) signal, an 8-PSK signal or a 16-PSK signal, but not limited thereto. In another embodiment, the phase-modulated drive signal $X_1(t)$ may be a differential phase shift keying (DPSK) signal, wherein the DPSK signal may be a differential BPSK (DBPSK) signal, a differential QPSK (DQPSK) signal, a differential 8PSK (D-8PSK) signal or a differential 16PSK (D-16PSK) signal, but not limited thereto.

Similarly, the drive circuits 52 are respectively coupled to the drive electrodes Ed of the touch panel 50. The drive circuits 52 include a drive unit 521 configured to output a phase-fixed drive signal x(t) or transmission data Data2, and a phase modulation unit 522 configured to output a phase-modulated drive signal $X_2(t)=r_2\angle\theta_2$ to the drive electrode Ed coupled thereto. In one embodiment, the drive circuits 52 are respectively coupled to the drive electrodes Ed through, for example, a plurality of switching elements (not shown).

Figure 7A:
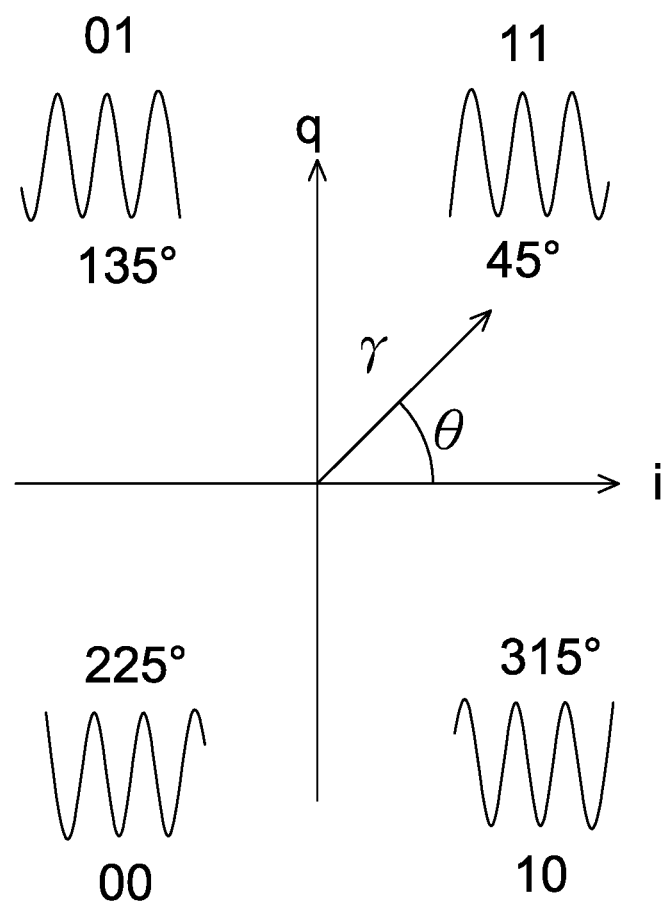
FIG. 7A is a schematic diagram of the QPSK modulation.

For example, FIG. 7A is a schematic diagram of the QPSK modulation. The encoding unit 4221 encodes the transmission data as, for example, four codes 11, 01, 00 and 10, and the modulation unit 4222 outputs the drive signal $X_1(t)=r_1\angle\theta_1$ with four phases 45°, 135°, 225° and 315° respectively according to the encoding of the encoding unit 4221, and the drive signal $X_1(t)$ is inputted to the drive electrodes Ed.

As mentioned above, the receiving electrodes Er of the touch panel 40 are respectively output a detection signal $y_1(t)$ according to the coupling electric field Ec as well as the coupling electric field between drive electrodes and receiving electrodes therein. In the touch detection mode, the detection signal $y_1(t)$ is associated with the drive signal inputted into the touch panel 40. In the near field communication mode, the detection signal $y_1(t)$ is associated with only the drive signal inputted into the touch panel 50 or associated with both the drive signals inputted into the touch panel 40 and the touch panel 50. The receiving electrodes Er of the touch panel 50 are respectively configured to output a detection signal $y_2(t)$ according to the coupling electric field Ec as well as the coupling electric field between drive electrodes and receiving electrodes therein. Similarly, information contained in the detection signal $y_2(t)$ is determined according to a current operating mode of the touch panel 50.

As mentioned above, the detection circuit 43 may be sequentially coupled to the receiving electrodes Er of the touch panel 40 (e.g. as shown in FIG. 5), and modulates the detection signal $y_1(t)$ respectively with two signals to generate two detection components $I_1$, $Q_1$ as shown in FIGS. 3A and 3B. The detection circuit 53 may be sequentially coupled to the receiving electrodes Er of the touch panel 50 (e.g. as shown in FIG. 5), and modulates the detection signal $y_2(t)$ respectively with two signals $S_1$, $S_2$ to generate two detection components $I_1$, $Q_1$. As mentioned above, the detection circuits 43, 53 may further include the integrator configured to integrate the detection signal y(t) and the ADC unit configured to perform the analog-to-digital conversion as shown in FIGS. 3A and 3B.

The processing unit 44 is coupled to the detection circuit 43 and configured to obtain a norm of vector according to the two detection components $I_1$, $Q_1$ to accordingly identify a touch event, wherein as shown in FIG. 4 the processing unit 44 may calculate the norm of vector, which is compared with a threshold TH, by CORDIC. The processing unit 54 is coupled to the detection circuit 53 and configured to obtain a norm of vector according to the two detection components $I_2$, $Q_2$ to accordingly identify a touch event and obtain a phase value according to the two detection components $I_2$, $Q_2$ to accordingly decode transmission data Data1', wherein the transmission data Data1' may totally or partially identical to the transmission data Data1 sent by the first capacitive touch device 400 depending on the bit error rate. In this embodiment, the transmission data Data1' is obtained by calculating an $\arctan(Q_2,I_2)$ of the two detection components $I_2$, $Q_2$ by a CORDIC 541 so as to obtain a phase value, and then decoding the phase value by a decoding unit 542. It is appreciated that the decoding unit 542 decodes the phase value corresponding to the encoding of the encoding unit 4221

In addition, in this embodiment in order to decrease the bit error rate, the processing unit 54 may further include a performance circuit 55. The performance circuit 55 includes, for example, an error detector configured to detect the bit error rate and a phase lock loop (PLL) configured to synchronize signals, track an input frequency, or generate a frequency that is a multiple of the input frequency. The phase lock loop includes, for example, a loop oscillator, a voltage control oscillator (VCO) or a numerical control oscillator (NCO), and the output of the performance circuit 55 is feedback to multipliers 531, 531' and 551, wherein the multipliers 531 and 531' are configured to modulate the detection signal $y_2(t)$ with two signals (e.g. $S_1$ and $S_2$ shown in FIG. 7), and the multiplier 551 is configured to feedback the output of the performance circuit 55 to the detection signal $y_2(t)$, e.g. adjusting the gain thereof.

In addition, if the touch panel 40 is also served as the receiving end of a communication system, the processing unit 44 also obtains phase values according to the two detection components $I_1$, $Q_1$ to accordingly decode transmission data Data2', and performs identical processes and has identical functions as the processing unit 54, e.g. further including a performance circuit and a decoding unit, but not limited thereto.

It should be mentioned that the drive circuit 52 of the second capacitive touch device 500 in FIG. 7 may include both a drive unit 521 and a phase modulation unit 522, or include the drive unit 521 without the phase modulation unit 522 depending on the function thereof. For example, if the second capacitive touch device 500 is configured to receive the near field communication data without sending the near field communication data, the drive circuit 52 may include only the drive unit 521 configured to output the phase-fixed drive signal x(t). In addition, in FIG. 7 the detection circuit 43 and the processing unit 44 of the first capacitive touch device 400 may be identical to the detection circuit 53 and the processing unit 54 of the second capacitive touch device 500, and details of the detection circuit 43 and the processing unit 44 are not shown for simplification. In addition, in FIG. 7 the processing unit 44 of the first capacitive touch device 400 may not include the performance circuit and the decoding unit depending on the function thereof. For example, if the first capacitive touch device 400 is configured to identify the touch event without performing the near field communication, only the CORDIC is included and the CORDIC is configured to calculate the norm of vector of the two detection components $I_1$, $Q_1$ but not calculate the phase value accordingly.

More specifically, in the first capacitive touch device 400 and the second capacitive touch device 500, when the function of transmitting the near field transmission data is included, the transmitting end includes the phase modulation unit, otherwise the phase modulation unit may not be included; and when the function of receiving the near field transmission data is included, the receiving end includes the decoding unit (further including the performance circuit in some embodiments) and is configured to calculate the norm of vector and the phase value according to the two detection components, otherwise the receiving end may not include the performance circuit and the decoding unit and is configured to calculate the norm of vector of the two detection components but not to calculate the phase value according to the two detection components.

Figure 9:
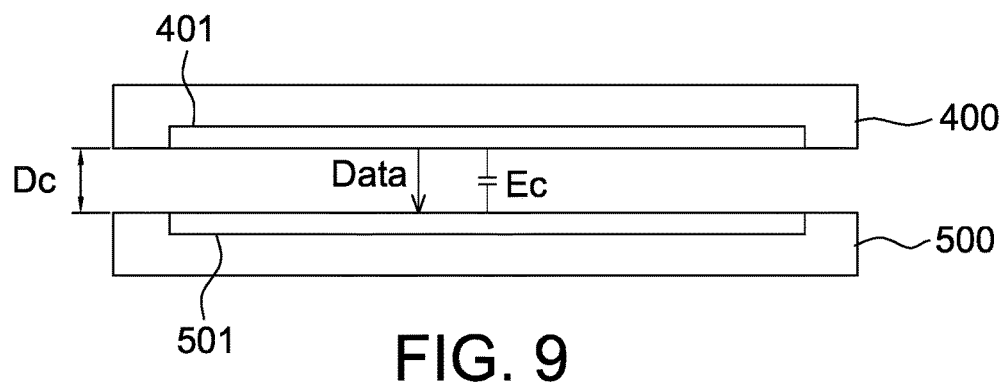
FIG. 9 is an operational schematic diagram of a communication system according to one embodiment of the present disclosure.

For example in one embodiment, the first capacitive touch device 400 is served as a transmitting device of the near field communication and the second capacitive touch device 500 is served as a receiving device of the near field communication. When a distance between the first capacitive touch device 400 and the second capacitive touch device 500 is larger than a near field communication distance Dc (e.g. 10 cm) as shown in FIG. 9, the second capacitive touch device 500 is operated in a touch detection mode and the drive circuit 52 outputs the phase-fixed drive signal x(t). When the drive circuit 52 does not receive a communication enabling signal, the phase-fixed drive signal x(t) is continuously outputted, wherein the communication enabling signal is for enabling the second capacitive touch device 500 to enter a near field communication mode from the touch detection mode.

Figure 10:
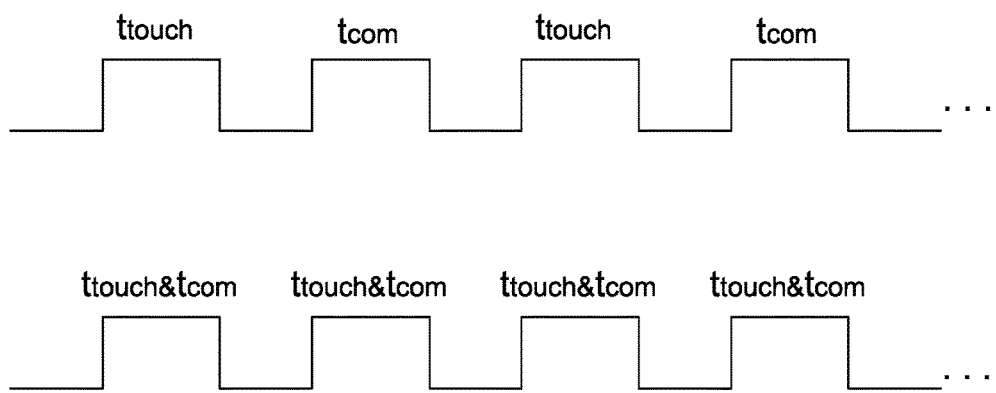
FIG. 10 is an operation sequence diagram of a communication system according to one embodiment of the present disclosure.

In one embodiment, the second capacitive touch device 500 detects an access code successively or every a predetermined time interval in a synchronization process to accordingly identify whether to enter the near field communication mode, wherein the access code includes, for example, the synchronization word, compensation code and/or device address. In order to detect whether to enter the near field communication mode, the processing unit 54 may calculate the norm of vector and the phase value according to an identical pair of the two detection components $I_2$ and $Q_2$ as shown in the lower part of FIG. 10. As mentioned above, as the phase variation in the detection signal does not influence the norm of vector of the two detection components $I_2$ and $Q_2$, the processing unit 54 may calculate both the norm of vector and the phase value according to the two detection components $I_2$ and $Q_2$ within identical time intervals (e.g. $t_{touch}$&$t_{com}$ in FIG. 10). In another embodiment, the processing unit 54 may alternatively calculate the norm of vector and the phase value according to different pairs of the two detection components $I_2$ and $Q_2$ (e.g. $t_{touch}$ and $t_{com}$ in FIG. 10) as shown in the upper part of FIG. 10.

In the synchronization process, the processing unit 54 is configured to compare a plurality of communication data with a predetermined code sequence (e.g. the access code) so as to confirm whether the synchronization is accomplished, wherein the predetermined code sequence includes, for example, Barker codes which are configured to synchronize phases between the transmitting end and the receiving end, but not limited thereto. The predetermined code sequence may also be other coding used in conventional communication systems. In one embodiment, when the processing unit 54 identifies that a correlation between a plurality of phase values (or transmission data) and the predetermined code sequence exceeds a threshold, it means that the synchronization is accomplished and the processing unit 54 controls the second capacitive touch device 500 to enter the near field communication mode. In another embodiment, when the processing unit 54 identifies that a plurality of phase values (or transmission data) matches a predetermined code sequence (e.g. the access code), it means that the synchronization is accomplished and the processing unit 54 controls the second capacitive touch device 500 to enter the near field communication mode. For example, when the near field communication mode is entered, the processing unit 54 outputs the communication enabling signal to the drive circuit 52 and stops identifying the touch event but only decodes the transmission data. When the drive circuit 52 receives the communication enabling signal, the drive signal x(t) is ceased.

In another embodiment, the communication enabling signal is outputted according to a trigger signal of a predetermined application (APP) or a press signal of a button. For example, when an icon shown on a screen of the second capacitive touch device 500 is triggered or a button is pressed, the processing unit 54 receives the trigger signal or the press signal and then outputs the communication enabling signal to the drive circuit 52. Next, the processing unit 54 detects an access code within a synchronization time interval, and when the synchronization is accomplished, the payload, i.e. the transmission data Data1, is received from the first capacitive touch device 400.

In this embodiment, as the first capacitive touch device 400 is served as a transmitting end to communicate with an external electric field, the first capacitive touch device 400 is served as a capacitive communication device. The first capacitive touch device 400 includes at least one drive electrode Ed configured to form the coupling electric field Ec with the external electric field. The drive circuit 42 is configured to output a phase-modulated signal of the predetermined code sequence (i.e. the access code) to the at least one drive electrode Ed of the touch panel 40 to communicate through the coupling electric electrode Ec. For example, the first capacitive touch device 400 may include only one drive electrode Ed to be served as a transmitting antenna so as to form one touch detection point.

In this embodiment, as the second capacitive touch device 500 is served as a receiving end to communicate with an external electric field, the second capacitive touch device 500 is also served as a capacitive communication device. The second capacitive touch device 500 may include at least one receiving electrode Er configured as a receiving antenna to form a coupling electric field Ec with the external electric field, and the receiving electrode Er is configured to output a detection signal $y_2(t)$ according to the coupling electric field Ec.

Figure 11A:
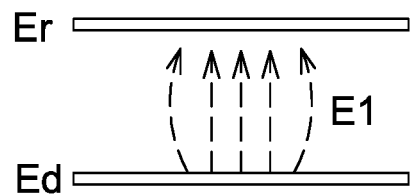
FIGS. 11A-11C are schematic diagrams of the electric field between a drive electrode and a receiving electrode.
Figure 11B:
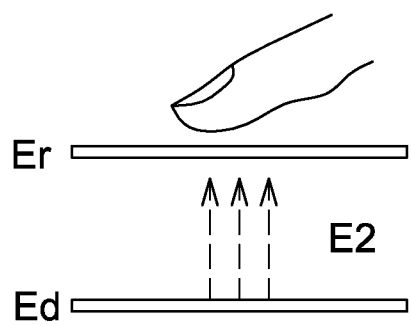
Figure 11C:
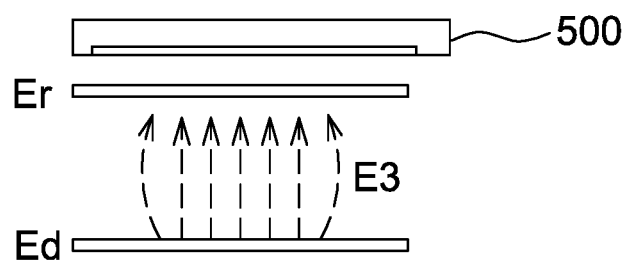

Referring to FIGS. 11A-11C, they are schematic diagrams of the induced electric field between a drive electrode Ed and a receiving electrode Er. According to FIGS. 11A and 11B, when a finger approaches, the induced electric field is weakened, i.e. E2<E1. According to FIGS. 11A and 11C, when an external capacitive touch device 500 approaches, the induced electric field is increased, i.e. E3>E1. Therefore, although in the present disclosure the touch event and the transmission data may be detected at the same time, the threshold TH to be compared with the norm of vector may be different in the touch detection mode and the near field communication mode thereby increasing the accuracy of identifying the touch event. For example, in the near field communication mode, a higher threshold may be used.

Figure 12:
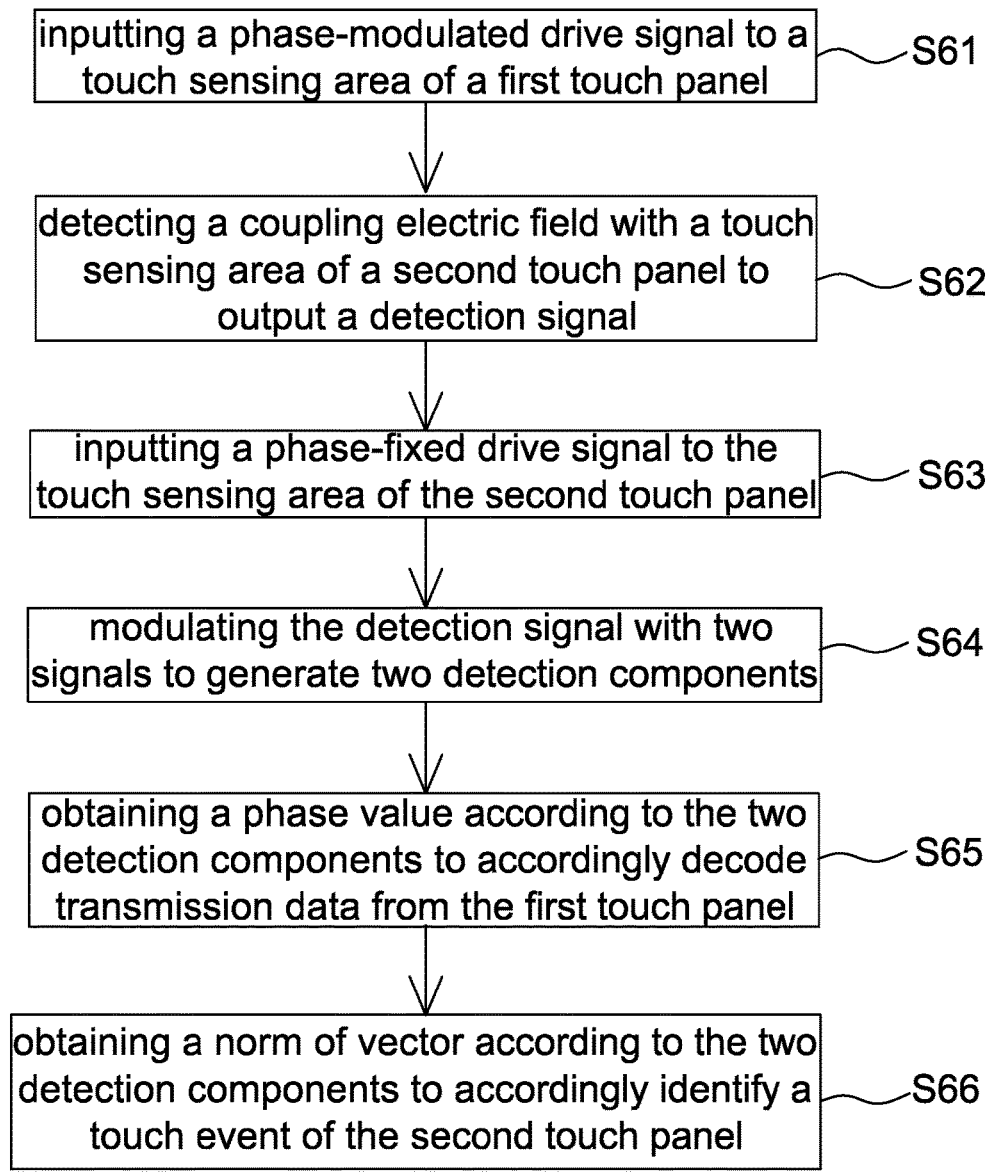
FIG. 12 is a flow chart of a communication method of a communication system according to one embodiment of the present disclosure.

Referring to FIG. 12, it is a flow chart of a communication method of a communication system according to one embodiment of the present disclosure, which includes the steps of: inputting a phase-modulated drive signal to a touch sensing area of a first touch panel (Step $S_{61}$); detecting a coupling electric field with a touch sensing area of a second touch panel to output a detection signal (Step $S_{62}$); inputting a phase-fixed drive signal to the touch sensing area of the second touch panel (Step $S_{63}$); modulating the detection signal respectively with two signals to generate two detection components (Step $S_{64}$); obtaining a phase value according to the two detection components to accordingly decode transmission data from the first touch panel (Step $S_{65}$); and obtaining a norm of vector according to the two detection components to accordingly identify a touch event of the second touch panel (Step $S_{66}$), wherein the Steps $S_{63}$ and $S_{66}$ may not be implemented according to different applications.

Referring to FIGS. 7, 9 and 12, details of this embodiment are illustrated hereinafter.

Step $S_{61}$: When a distance between a first touch panel (e.g. the touch panel 40 herein) and a second touch panel (e.g. the touch panel 50 herein) is smaller than a near field communication distance Dc, the first touch panel 40 enters a near field communication mode. Meanwhile, the drive circuit (e.g. the drive circuit 42 herein) of the first capacitive touch device 400 inputs the phase-modulated drive signal $X_1(t) = r_1 \angle \theta_1$ to a touch sensing area 401 of the first touch panel 40. For example, the distance may be identified according to the increment of the electric field as shown in FIG. 11C.

Step $S_{62}$: As a distance between the first touch panel 40 and the second touch panel 50 is smaller than the near field communication distance Dc, a coupling electric field Ec is formed therebetween. A touch sensing area 501 of the second touch panel 50 then outputs a detection signal $y_2(t)$ according to the coupling electric field Ec.

Step $S_{63}$: If the second touch panel 50 does not detect the touch event in the near field communication mode, this step may not be implemented. Otherwise, the drive circuit 52 of the second capacitive touch device 500 outputs a phase-fixed drive signal x(t) to the touch sensing area 501 of the second touch panel 50 such that the detection signal $y_2(t)$ contains the output information of both the drive circuit 42 and the drive circuit 52.

Step $S_{64}$: The detection circuit 53 of the second capacitive touch device 500 modulates the detection signal $y_2(t)$ respectively with two signals (e.g. $S_1$ and $S_2$ shown in FIG. 3A) to generate two detection components $I_2$ and $Q_2$.

Step $S_{65}$: The processing unit 54 of the second capacitive touch device 500 obtains a phase value according to the two detection components $I_2$ and $Q_2$ to accordingly decode transmission data Data1' sent from the first touch panel 40.

Step $S_{66}$: If the second touch panel 50 does not detect the touch event in the near field communication mode, this step may not be implemented. Otherwise, the processing unit 54 of the second capacitive touch device 500 further obtains a norm of vector, which is then compared with at least one threshold (e.g. as shown in FIG. 4), according to the two detection components $I_2$ and $Q_2$ to accordingly identify a touch event of the second touch panel 400.

It should be mentioned that in this embodiment, the first touch panel 40 may also be a receiving end and the second touch panel 50 may also be a transmitting end. It is appreciated that when both the first touch panel 40 and the second touch panel 50 are used to send data, after the synchronization the transmitting interval is further arranged, e.g. transmitting data alternatively.

Figure 13:
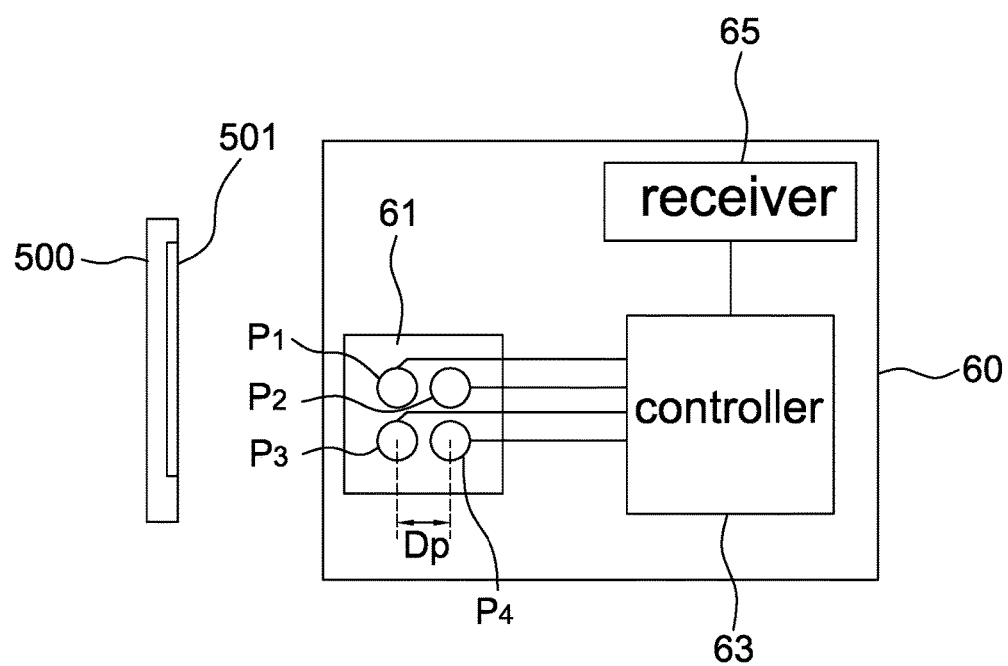
FIG. 13 is a block diagram of a capacitive communication system according to an alternative embodiment of the present disclosure.
Figure 14:
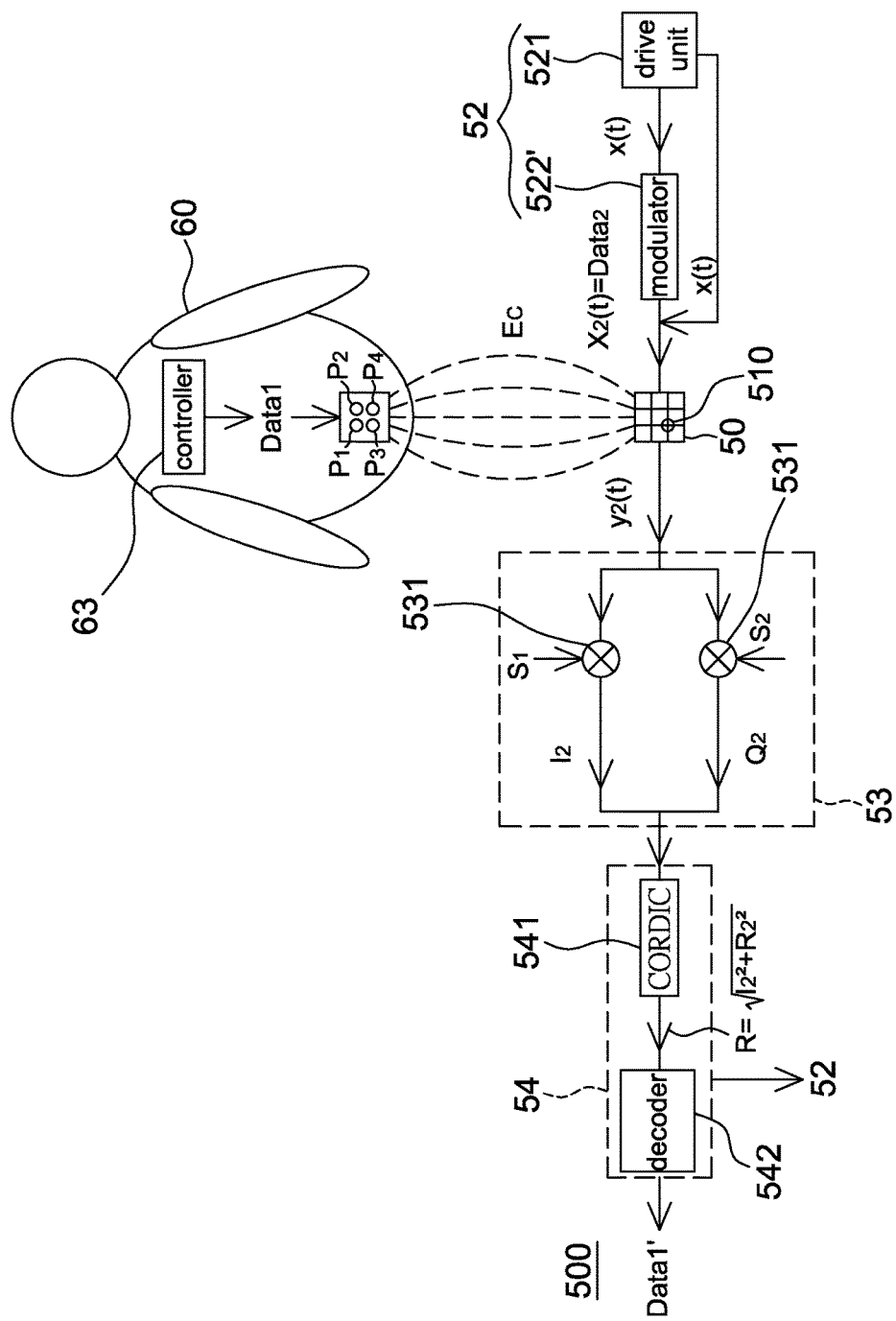
FIG. 14 is a schematic diagram of a capacitive communication system according to an alternative embodiment of the present disclosure.

Referring to FIGS. 13 and 14, FIG. 13 is a block diagram of a capacitive communication system according to an alternative embodiment of the present disclosure; and FIG. 14 is a schematic diagram of a capacitive communication system according to an alternative embodiment of the present disclosure. The capacitive communication system of this embodiment includes an object 60 and a capacitive touch device, wherein the second capacitive touch device 500 in FIGS. 7-9 is taken as an example for illustrating the capacitive touch device herein.

As mentioned above, the second capacitive touch device 500 includes a capacitive touch panel 50 and a touch sensing area 501. Every element of the second capacitive touch device 500 has been illustrated above and thus details thereof are not described herein. The present embodiment is different in that the capacitive touch device 500 includes a modulator 522' which is not limited to performing the phase modulation. The modulator 522' is possible to further perform the amplitude modulation and/or the frequency modulation.

Figure 15A:
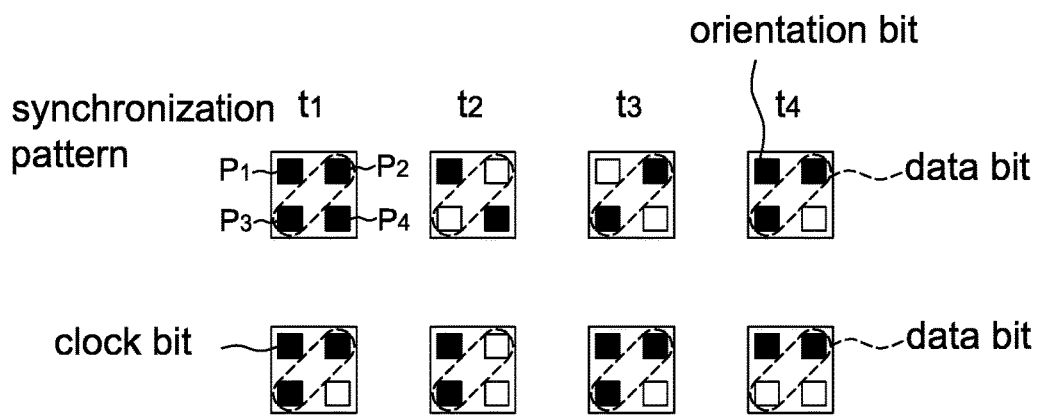
FIG. 15A is a schematic diagram of identification data according to an alternative embodiment of the present disclosure.

The object 60 includes a plurality of induction conductors (e.g., 4 induction conductors P1 to P4 are taken as an example herein) configured to have different potential distributions at different time intervals by modulating respective potentials on the induction conductors. For example in FIG. 15A, the induction conductors P1 to P4 have different potential distributions at times $t_1$ to $t_4$. FIG. 15A is a schematic diagram of identification data according to an alternative embodiment of the present disclosure, wherein filled rectangles are referred to a digital value "1" and blank rectangles are referred to a digital value "0", and vice versa. The material of the induction conductors P1 to P4 does not have particular limitations as long as capacitance of the capacitive touch panel 50 is changed when the induction conductors P1 to P4 are nearby.

The capacitive touch panel 50 includes a plurality of sensing electrodes (e.g., Ed and Er of FIG. 8) configured to form a coupling electric field Ec with the induction conductors P1 to P4 (as shown in FIG. 14) so as to detect the different potential distributions at the different time intervals (e.g., times $t_1$ to $t_4$ of FIG. 15A). When the different potential distributions match a predetermined agreement between the capacitive touch panel 50 (or the capacitive touch device 500) and the object 60, a near field communication between the capacitive touch panel 50 and the object 60 is formed. In one embodiment, the near field communication is a Bluetooth communication, but not limited thereto.

Said predetermined agreement does not have particular limitations as long as the object 60 and the capacitive touch device 500 are recognizable. Accordingly, the predetermined agreement may be previously set before shipment or implemented by installing application software in the capacitive touch device 500. In one embodiment, the induction conductors P1 and/or P4 are used as the clock bit for sending clock data, and the induction conductors P2 and P3 are used as data bits for sending transmission data Data1. For example, said predetermined agreement is shown as potential distributions in FIG. 15A sequentially detected by sensing frames of the capacitive touch device 500 at times $t_1$ to $t_4$. More specifically, the potential at each time (e.g., $t_1$ to $t_4$) and the potential variation between each time (e.g., $t_1$ to $t_4$) of the induction conductors P1 to P4 are detectable by the capacitive touch panel 50.

In addition, for confirming a direction of the object 60 with respect to the capacitive touch panel 50, one of the induction conductors P1 to P4 is used as an orientation bit or positioning bit, e.g., one of the clock bit(s) is served as the orientation bit. Accordingly, a relative direction of the object 60 with respect to the capacitive touch panel 50 is recognizable so as to confirm a sequence of bits of the induction conductors P2 and P3, e.g., P2 is prior to P3 herein.

Figure 16:
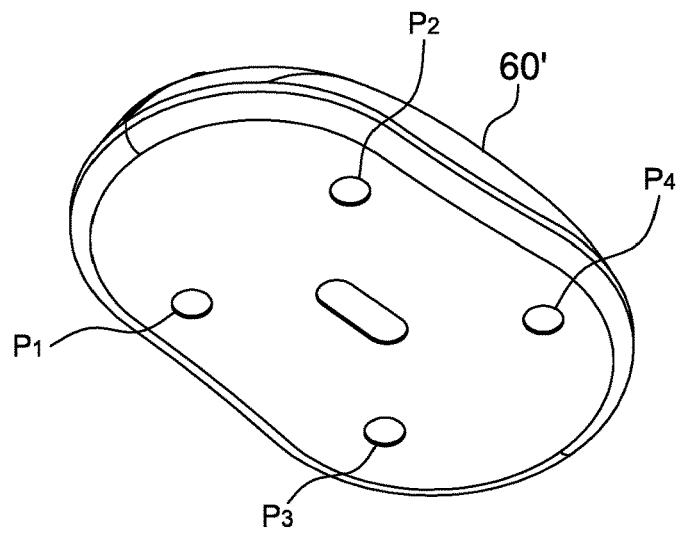
FIG. 16 is a schematic diagram of an object and induction conductors according to an alternative embodiment of the present disclosure.

The object 60 is, for example, an electronic lock, a mouse device, an earphone, a watch, a bracelet, a smart pen, a doll or an electronic mobile device having another capacitive touch panel. The induction conductors P1 to P4 are arranged, for example, on an object surface 61 of the object 60 to be easily detected by the capacitive touch panel 50. For example, when the object 60 is a mouse 60' (referring to FIG. 16), the induction conductors P1 to P4 are arranged at a bottom surface of the mouse 60', e.g., at four supporting protrusions at the bottom surface (i.e., the object surface 61), but not limited thereto. It is possible to dispose the induction conductors P1 to P4 inside the object 60.

Figure 17:
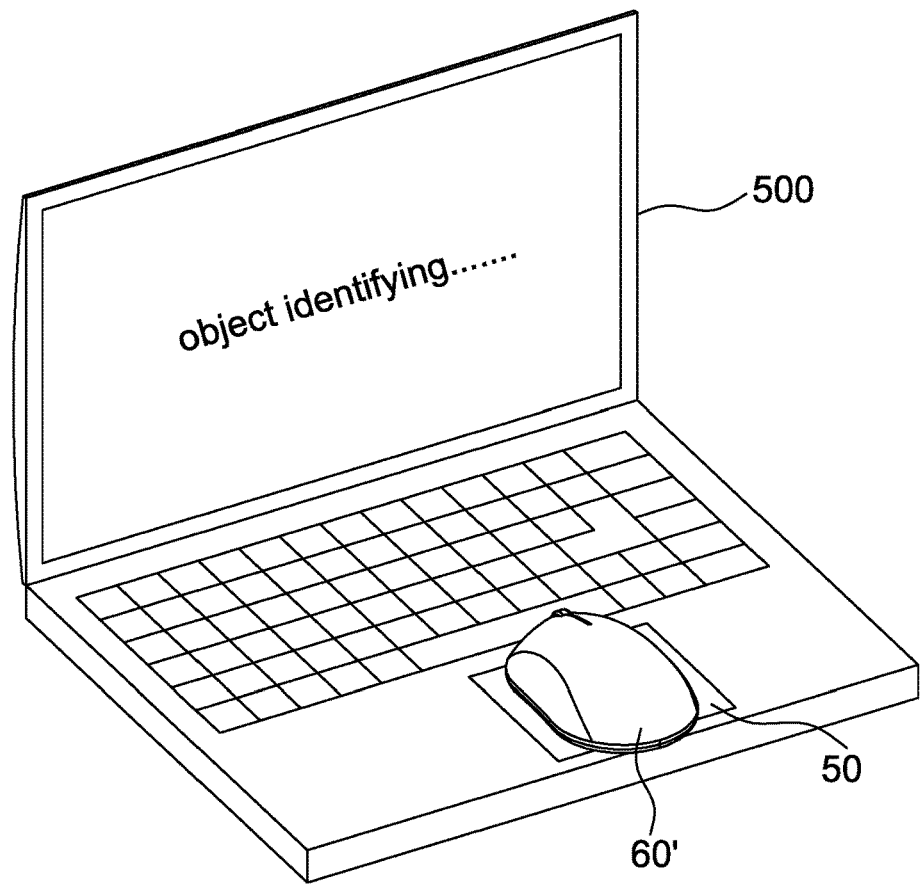
FIG. 17 is an operational schematic diagram of the object in FIG. 16.

Accordingly, when the mouse 60' is positioned on the capacitive touch panel 50 of the capacitive touch device 500 (e.g., a notebook computer is taken as an example in FIG. 17), the capacitive touch device 500 is able to detect the approaching of the induction conductors P1 to P4, e.g., capacitance being changed. The capacitive touch device 500 is able to confirm whether a near field communication mode is entered according to an arrangement characteristic of the induction conductors P1 to P4.

For example, the induction conductors P1 to P4 have the arrangement characteristic such as predetermined areas, a predetermined potential distribution and a predetermined arrangement, and said arrangement characteristic is previously stored in a memory of the capacitive touch device 500. When the capacitive touch device 500 confirms the predetermined areas (e.g., respective area of each induction conductor), the predetermined potential distribution (e.g., potentials of every induction conductor at one time) and/or the predetermined arrangement (e.g., pitch and/or shape being formed), a near field communication mode is entered so as to detect the different potential distributions at the different time intervals, e.g., a plurality of sensing elements 510 (referring to FIG. 8) which sense the induction conductors P1 to P4 indicating the matching with the predetermined areas, the predetermined potential distribution and/or the predetermined arrangement. More specifically, the capacitive touch device 500 is able to recognize a respective area, a respective potential or potential variation, an arrangement shape or pitch of the induction conductors P1 to P4 according to a plurality of sensing elements 510 which sense the induction conductors P1 to P4. When the arrangement characteristic matches the pre-stored information in the capacitive touch device 500, the near field communication mode is entered.

In some embodiments, the arrangement characteristic is time-variant, e.g., the predetermined potential variation (i.e. potential variation pattern) within a predetermined period of one or several induction conductors P1 to P4. More specifically, the arrangement characteristic may be a combination of several characteristics so as to improve the identification accuracy. For example, the predetermined areas, the predetermined potential distribution and/or the predetermined arrangement is used as the arrangement characteristic of a first stage, and then the predetermined potential variation of the one or several induction conductors P1 to P4 is used as the arrangement characteristic of a second stage.

When the predetermined potential variation is used as the arrangement characteristic, the capacitive touch device 500 preferably has a buffering time, which is longer than the predetermined period, in identifying a touch, i.e. a touch event being confirmed occurring when a plurality of successive sensing frames detect the touch, and the capacitance variation within the predetermined period not taken as a touch event.

Referring to FIGS. 13 and 14, it should be mentioned that although FIGS. 13 and 14 show that the object 60 includes 4 induction conductors P1 to P4, they are only intended to illustrate but not to limit the present disclosure. It is possible that the object 60 includes at least one induction conductor (e.g., one or two induction conductors), but a number of the induction conductors does not limited to that given in the present disclosure. In addition, every conductor P1 to P4 may have different areas or shapes for being distinguished.

The object 60 further includes a controller 63, which is a microcontroller (MCU) or an application specific integrated circuit (ASIC), coupled to the at least one induction conductor. The controller 63 is used to modulate a potential of the at least one induction conductor to be used as identification data, wherein the identification data is, for example, shown as potential distributions of the at least one induction conductor (e.g., P1 to P4) at times $t_1$ to $t_4$ in the synchronization pattern of FIG. 15A. The identification data is for the capacitive touch device 500 to distinguish different objects. In other words, the capacitive touch device 500 stores therein (e.g., in a memory) the identification data associated with at least one object to be compared with a detection result. The memory is volatile or nonvolatile without particular limitations.

The capacitive touch panel 50 includes at least one sensing electrode (e.g., Er shown in FIG. 8) and a processing unit 54. The at least one sensing electrode is used to form a coupling electric field Ec with the at least one induction conductor, wherein the sensing electrode is used to output a detection signal $y_2(t)$ corresponding to the identification data according to the coupling electric field Ec. The processing unit 54 is, for example, a central processing unit (CPU) and used to identify whether the object 60 is a specific object according to the detection signal $y_2(t)$, wherein said specific object is an object which has associated and predetermined application software in the capacitive touch device 500, and information of the specific object is pre-stored in the capacitive touch device 500.

In one embodiment, the controller 63 modulates a potential of the at least one induction conductor with a fixed cycle to generate a potential variation. For example, in FIG. 15A, at times $t_1$ to $t_4$ a potential variation of the induction conductor P1 is shown to be 1→1→0→1, wherein a time interval between $t_1$ and $t_2$, between $t_2$ and $t_3$ and between $t_3$ and $t_4$ are identical. Potential variations of the induction conductors P2 to P4 are also shown in FIG. 15A. FIG. 15A shows embodiments with two clock bits (upper half figure) and one clock bit (lower half figure), but not limited thereto. The processing unit 54 of the capacitive touch device 500 is used to obtain the potential variation according to the detection signal $y_2(t)$, and identify whether the detected object is belong to a specific object. For example, when the potential variation of the induction conductor P1 (e.g., distinguished using the orientation bit) at successive time intervals matches 1→1→0→1, it is identified that the object belongs to a predetermined specific object. Then, the capacitive touch device 500 executes application software associated with the specific object or performs other control(s) according to different applications.

Figure 18:
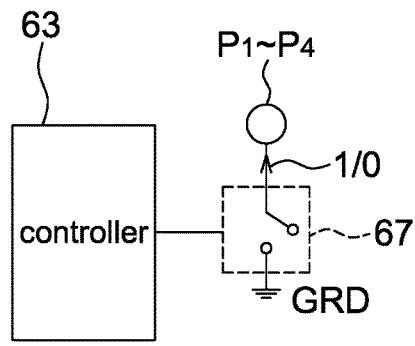
FIG. 18 is schematic diagram of controlling the potential of induction conductors in an alternative embodiment of the present disclosure.

Referring to FIG. 18, in some embodiments, the controller 63 controls, e.g., via a switching device 67, the induction conductors P1 to P4 to be grounded or floated to change the potential as "1" or "0", but not limited thereto. In other embodiments, the controller 63 is used to modulate the amplitude, frequency and/or phase of the potential of the induction conductors P1 to P4 without particular limitations as long as "1" and "0" are distinguishable.

When the object 60 includes a plurality of induction conductors (e.g., two of P1 to P4), the controller 63 is used to respectively control a respective potential of every induction conductor. For example, in FIG. 15A, the induction conductors P2 and P4 have different potential variations from time $t_1$ to $t_4$.

If the capacitive touch device 500 performs a near field communication with two induction conductors using only one sensing electrode (e.g., one of Er in FIG. 8), the single sensing electrode is used to detect a sum of potentials of the two induction conductors; i.e. the single sensing electrode is used as a receiving antenna. In other words, those stored in the capacitive touch device 500 are not the potential variation patterns of each induction conductor but are the variation patterns of a sum of potentials. Similarly, when the object 60 includes more than two induction conductors, the single sensing electrode is also used to detect a sum of potentials of the more than two induction conductors.

If the capacitive touch panel 50 performs a near field communication with two induction conductors using a plurality of sensing electrodes (e.g. Er of FIG. 8), the sensing electrodes are used to detect a respective potential of each of the two induction conductors. In other words, the capacitive touch device 500 stores potential variation patterns of each of the induction conductors, e.g., shown in FIG. 15A. Similarly, when the object 60 includes more than two induction conductors, the respective potential of each of the more than two induction conductors is detectable.

As mentioned above, to eliminate the interference on detecting results due to the phase shift caused by the capacitance on signal lines, the capacitive touch device 500 further includes a detection circuit 53 coupled to the sensing electrode. The detection circuit 53 modulates the detection signal $y_2(t)$ respectively with two signals $S_1$ and $S_2$ to generate two detection components $I_2$ and $Q_2$. The processing unit 54 obtains a norm of vector according to the two detection components $I_2$ and $Q_2$, and compares a plurality of norm of vectors corresponding to the identification data with a predetermined code thereby identifying whether the object 60 is a predetermined specific object. In other words, in this embodiment, in addition to identifying a touch event according to the norm of vector (e.g., referring to FIG. 4), the processing unit 54 further identifies potential variation patterns (e.g., referring to FIG. 15A) of every induction conductor (e.g. P1 to P4) according to a plurality of norm of vectors.

The capacitive touch device 500 preferably has a mechanism to switch from a touch detection mode to a near field communication mode. As mentioned above, the mechanism is set as the capacitive touch device 500 identifying whether a button is pressed or whether the capacitance value of the capacitive touch panel 50 is increased. In other embodiments, the mechanism is set as the capacitive touch device 500 identifying an arrangement characteristic of the at least one induction conductors (e.g., P1 to P4). As mentioned above, when the capacitive touch device 500 recognizes the predetermined area, the predetermined potential distribution and/or the predetermined arrangement, a near field communication is entered.

In one embodiment, when the near field communication is entered, the processing unit 54 is selected to stop identifying a touch event according to the detection signal $y_2(t)$.

Figure 15B:
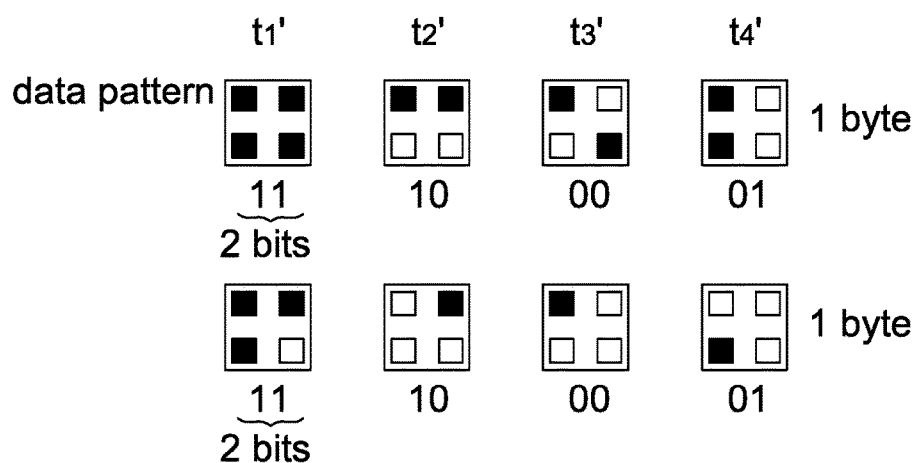
FIG. 15B is a schematic diagram of transmission data according to an alternative embodiment of the present disclosure.

In the near field communication mode, the processing unit 54 is further used to send a transmission start signal when the identification data (e.g., the synchronization pattern in FIG. 15A) matches a predetermined code. After receiving the transmission start signal, the object 60 sends transmission data. For example, FIG. 15B shows embodiments of the transmission data 11, 10, 00 and 01 (e.g., corresponding to times $t_1'$ to $t_4'$) with two clock bits and one clock bit, but not limited thereto. In this embodiment, the synchronization pattern in FIG. 15A is used as identification data, whereas the data pattern in FIG. 15B is used as the transmission data associated with an operation of the object 60.

The transmission data includes digital information of the object 60, e.g., electricity information, operating pattern information, time information, music information, tag information or the like. In addition, the capacitive touch device 500 is selected to show the transmission data on a screen.

In the near field communication mode, the processing unit 54 is further used to control the capacitive touch panel 50 to output a response communication data via the coupling electric field Ec when the identification data matches a predetermined core (e.g., the synchronization pattern in FIG. 15A). For example, when the object 60 is an electronic mobile device including another capacitive touch panel (e.g., the first capacitive touch device 400 in FIGS. 7 to 8), the capacitive touch device 500 uses the transmission data Data2 as the response transmission data, wherein the response transmission data is used to control, for example, the operation state of the object 60 (e.g., ON/OFF, sleep mode). In addition, when the object 60 is the first capacitive touch device 400, the induction conductors are selected from a part of the drive electrodes Ed. For example, the induction conductor P1 in FIG. 15A is replaced by the first drive electrode Ed of FIG. 8, the induction conductor P2 is replaced by the third drive electrode Ed of FIG. 8, the induction conductor P3 is replaced by the fifth drive electrode Ed of FIG. 8 and so on. In other words, a shape of the induction conductor is not limited to be a circle.

Preferably, a distance (or pitch) between the induction conductors is at least larger than 12 mm, but not limited to. The distance is determined according to a resolution of the capacitive touch panel 50.

The conventional Bluetooth pairing procedure between a master device and a slave device is complicated, e.g., requiring more than 6 steps including respectively setting the master device and the slave device, and the pairing being accomplished within a predetermined time. One embodiment of the above capacitive communication system is applicable to simplify the triggering procedure of the Bluetooth pairing.

Figure 19:
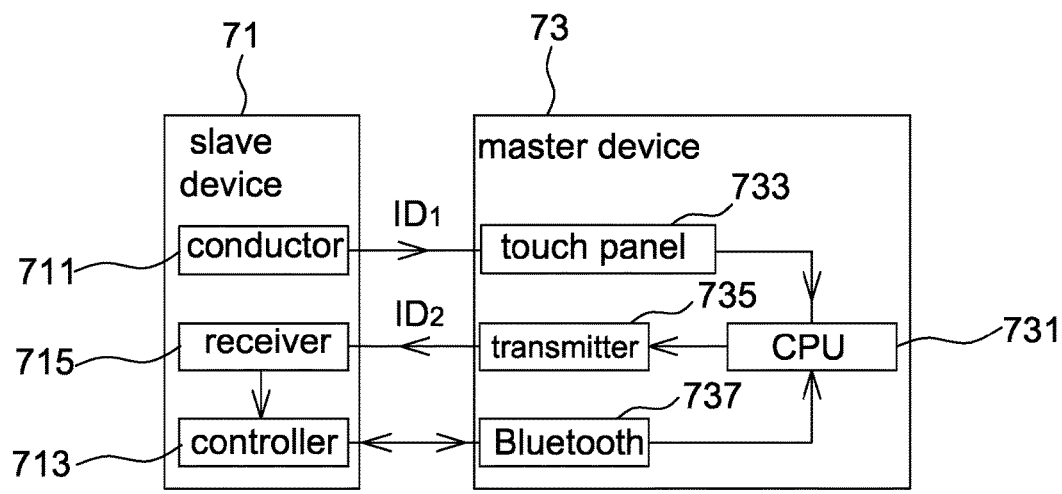
FIG. 19 is a block diagram of Bluetooth pairing according to an alternative embodiment of the present disclosure.

Referring to FIG. 19, it is a block diagram of Bluetooth pairing according to an alternative embodiment of the present disclosure. This embodiment is adapted to a Bluetooth pairing procedure between a master device 73 including a capacitive touch panel 733 and a slave device 71 including at least one induction conductor 711.

In this embodiment, the slave device 71 is, for example, said object 60 which includes at least one induction conductor 711 (e.g., induction conductors P1 to P4), a controller 713 (e.g., controller 63) and a receiver 715. The object 60, the at least one induction conductor P1 to P4 and the controller 63 have been described above, and thus details thereof are not repeated herein. The receiver 715 is used to receive device information $ID_2$ (e.g., address information) from the master device 73. The receiver 715 is, for example, an optical receiver (e.g., photodiode), an audio receiver (e.g., microphone), a capacitive sensing element (e.g., capacitive touch panel) or a magnetic sensing element (e.g., Hall sensor) according to different applications.

The master device 73 is, for example, said capacitive touch device 500 which includes a central processing unit 731 (e.g., the processing unit 54), a capacitive touch panel 733 (e.g., the capacitive touch panel 50), a transmitter 735 and a Bluetooth interface 737. The capacitive touch device 500 and the capacitive touch panel 50 thereof are described above, and thus details thereof are not repeated herein. The transmitter 735 is used to output the device information $ID_2$ of the master device 73. The transmitter 735 is, for example, a light emitter (e.g., light emitting diode), a sound generator (e.g., speaker), a sensing electrode (e.g., Ed, Er of FIG. 8) or magnetic generating component (e.g., magnet) according to different applications. The Bluetooth interface 737 is used to perform the Bluetooth pairing with the slave device 71. The central processing unit 731 is electrically coupled to the capacitive touch panel 733, the transmitter 735 and the Bluetooth interface 737, and used to identify whether the slave device 71 is a predetermined specific object, control the transmitter 735 to send the device information $ID_2$ to the slave device 71, and control the Bluetooth interface 737 to perform the Bluetooth pairing.

Figure 20:
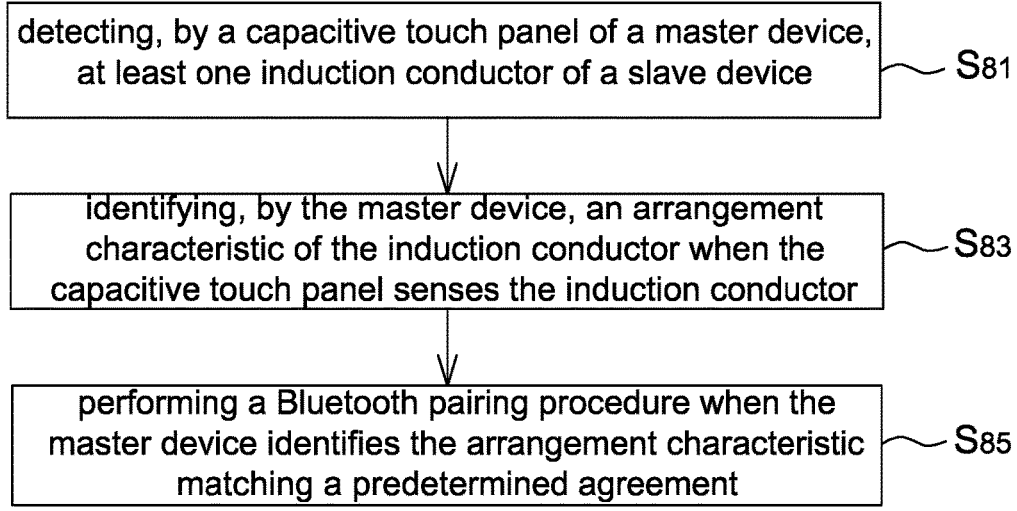
FIGS. 20-21 are flow charts of Bluetooth pairing methods according to alternative embodiments of the present disclosure.

Referring to FIG. 20, in one embodiment, the Bluetooth pairing method includes the steps of: detecting, by a capacitive touch panel, at least one induction conductor (Step S81); identifying, by a master device, an arrangement characteristic of the at least one induction conductor when the capacitive touch panel senses the at least one induction conductor (Step S83); and performing a Bluetooth pairing procedure when the master device identifies the arrangement characteristic matching a predetermined agreement (Step S85).

Step S81: As mentioned above, when the slave device 71 approaches the capacitive touch panel 733, the at least one induction conductor 711 causes the capacitance variation of the capacitive touch panel 733. Accordingly, the master device 73 is able to identify that the slave device 71 appears near the capacitive touch panel 733.

Step S83: When the master device 73 identifies that the capacitive touch panel 733 senses the at least one induction conductor 711, the master device 73 starts to identify an arrangement characteristic of the at least one induction conductor 711.

In one embodiment, the slave device 71 includes a single induction conductor 711, e.g., one of P1 to P4 shown in FIGS. 13-15A. The arrangement characteristic includes at least one of an area, a potential and a potential variation of the single induction conductor 711 (e.g., P1), wherein the potential may cause the capacitance of the capacitive touch panel 733 changing to a predetermined value, and the potential variation may be the potential variation $1 \rightarrow 1 \rightarrow 0 \rightarrow 1$ from time $t_1$ to $t_4$ shown in FIG. 15A.

In one embodiment, the slave device 71 includes a plurality of induction conductors 711, e.g., P1 to P4 shown in FIGS. 13-15A. The arrangement characteristic includes at least one of a pitch Dp (referring to FIG. 13), an arrangement pattern (e.g., spatial positioning and shape), a potential distribution pattern and a potential variation pattern (e.g., temporal potential variation), as shown in FIGS. 15A and 15B.

Step S85: When the master device 73 identifies that the arrangement characteristic matches a predetermined agreement between the master device 73 and the slave device 71, a Bluetooth pairing procedure is directly performed, wherein said Bluetooth pairing procedure is known to the art. The present disclosure is to simplify a triggering procedure of the Bluetooth pairing procedure. A user only needs to put the slave device 71 (e.g., object 60) having an identifiable agreement with the master device 73 within a detectable range of the capacitive touch panel 733, e.g., the near field communication distance Dc shown in FIG. 9, the Bluetooth pairing procedure is accomplished easily.

Figure 21:
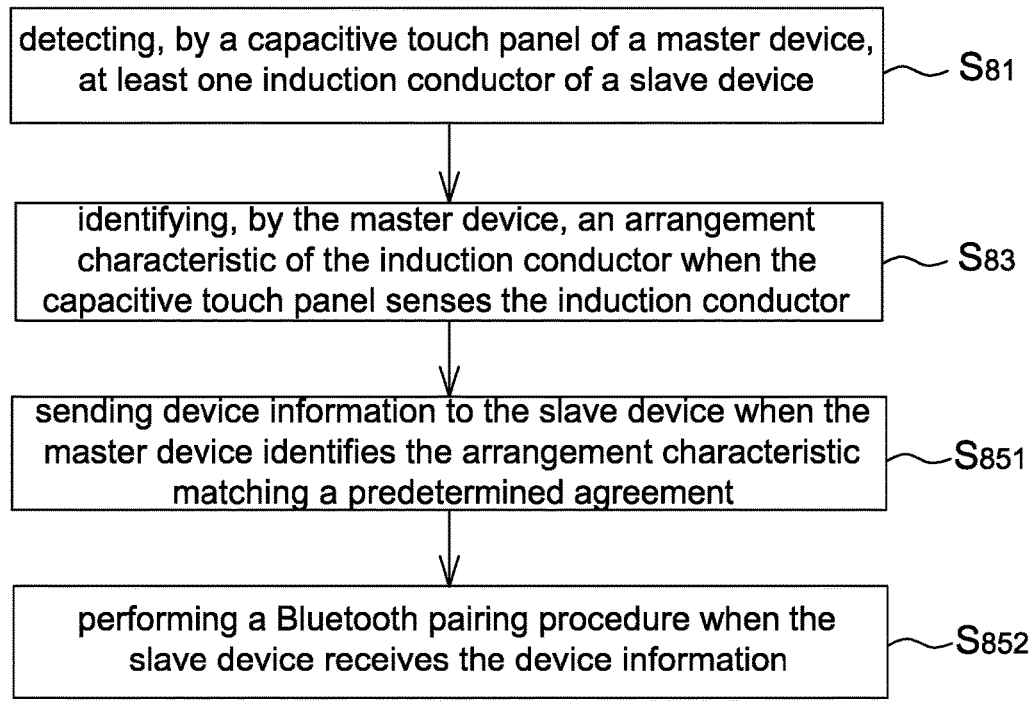

Referring to FIG. 21, it is another flow chart of a Bluetooth pairing between a master device and a slave device, including the steps of: detecting, by a capacitive touch panel, at least one induction conductor (Step S81); identifying, by a master device, an arrangement characteristic of the at least one induction conductor when the capacitive touch panel detects the at least one induction conductor (Step S83); sending device information to a slave device when the master device identifies the arrangement characteristic matching a predetermined agreement (Step S851); and performing a Bluetooth pairing procedure when the slave device receives the device information (Step S852).

The difference from FIG. 20 is that in FIG. 21 the slave device 71 does not enter a Bluetooth pairing mode before approaching the capacitive touch panel 733 such that device information $ID_2$ (e.g., the identification data) of the master device 73 has to be received from the master device 73 in order to enter the Bluetooth pairing mode (Step S851) and then the Bluetooth pairing procedure can be accomplished (Step S852). The Steps S81 and S83 are identical to those of FIG. 20 and thus details thereof are not repeated herein.

More specifically, in the present disclosure a triggering procedure of the Bluetooth pairing has two ways.

In the first way, before the slave device 71 approaches the master device 73, the slave device 71 has entered a Bluetooth pairing mode. Accordingly, when the master device 73 identifies that the arrangement characteristic of the induction conductor 711 of the slave device 71 matches a predetermined agreement, a Bluetooth pairing procedure is directly performed (as shown in FIG. 20).

In the second way, before the slave device 71 approaches the master device 73, the slave device 71 does not enter a Bluetooth pairing mode. Accordingly, when the master device 73 identifies that the arrangement characteristic of the induction conductor 711 of the slave device 71 matches a predetermined agreement, the master device 73 firstly sends device information $ID_2$ (e.g., address information) to the slave device 71, and a Bluetooth pairing procedure is performed after the slave device 71 receives the device information $ID_2$. In this embodiment, the master device 73 sends the device information $ID_2$ via, for example, the capacitance sensing, light, sound, or magnetic induction. More specifically, the master device 73 and the slave device 71 further have a pair of components for transmitting the device information $ID_2$, e.g., a speaker and microphone, a light source and light sensor, and magnetic generator and Hall sensor. The near field communication is used to communicate device information (e.g., $ID_1$ and $ID_2$) of the object (e.g., 71) and the capacitive touch panel (e.g., 73) for a Bluetooth communication In other embodiments, the slave device 71 also includes a capacitive touch panel to provide the arrangement characteristic to the master device 73 via the capacitive touch panel thereof. In this case, the slave device 71 does not include another induction conductors used for providing the arrangement characteristic, e.g., the capacitive touch panel being used as a signal source. The slave device 71 may provide the arrangement characteristic and encoding information to the master device 73 via the capacitive touch panel thereof, and receive encoding information from the master device 73 via the capacitive touch panel thereof such that the two devices may link through the near field communication thereby realizing the out-of-band pairing.

It should be mentioned that although the above embodiments are described by the mutual-capacitive touch panel, i.e. the drive electrode and receiving electrode crossing to each other, and said sensing electrode including the drive electrode and receiving electrode, but the present disclosure is not limited thereto. In other embodiment, the capacitive touch panel is a self-capacitive touch panel, i.e. the drive electrode and the receiving electrode being identical, and said sensing electrode being the drive electrode and receiving electrode.

As mentioned above, the conventional capacitive touch device may only detect an amplitude variation of the detection signal so as to identify whether a touch event occurs. Therefore, the present disclosure further provides a capacitive communication system (FIGS. 13 and 14) and a Bluetooth pairing method (FIGS. 20-21) that may realize the object identification and data transmission by using a near field communication.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A mouse, comprising:
 a plurality of induction conductors, wherein at least one of the plurality of induction conductors is configured to transmit clock data, and one of the plurality of induction conductors is configured as a positioning bit configured for indicating a direction of the mouse; and
 a controller coupled to the plurality of induction conductors, and configured to respectively modulate a potential of each of the plurality of induction conductors with a fixed cycle to generate a potential variation as identification data which indicates the mouse as a specific object.

2. The mouse as claimed in claim 1, wherein the mouse has two induction conductors.

3. The mouse as claimed in claim 1, wherein the controller is configured to modulate at least one of an amplitude, a frequency and a phase of the potentials.

4. The mouse as claimed in claim 1, wherein the plurality of induction conductors has a predetermined area, a predetermined potential and a predetermined arrangement.

5. The mouse as claimed in claim 1, wherein the plurality of induction conductors is further configured to send transmission data via a near field communication after the mouse receives a transmission start signal.

6. A capacitive touch device, configured to perform a near field communication with an object which comprises a plurality of induction conductors one of which is configured as a positioning bit, the capacitive touch device comprising:
 at least one sensing electrode configured to form a coupling electric field with the plurality of induction conductors, wherein the sensing electrode is configured to output a detection signal according to the coupling electric field;
 a detection circuit coupled to the sensing electrode and configured to modulate the detection signal respectively with two signals to generate two detection components; and
 a processing unit configured to identify whether the object is a specific object according to the detection signal, and recognize a direction of the object with respect to the capacitive touch device according to the positioning bit,
 wherein the processing unit is configured to obtain a norm of vector according to the two detection components, and compare a plurality of norm of vectors with a predetermined code to identify whether the object is the specific object.

7. The capacitive touch device as claimed in claim 6, wherein the capacitive touch device is integrated on a notebook computer.

8. The capacitive touch device as claimed in claim 6, wherein the sensing electrode is configured to detect a sum of potentials of the plurality of induction conductors.

9. The capacitive touch device as claimed in claim 6, comprising a plurality of sensing electrodes configured to detect a respective potential of each of the plurality of induction conductors.

10. The capacitive touch device as claimed in claim 6, wherein the processing unit is further configured to enter a near field communication mode when identifying at least one of a predetermined area, a predetermined potential and a predetermined arrangement of the plurality of induction conductors.

11. The capacitive touch device as claimed in claim 10, wherein in the near field communication mode, the processing unit is further configured to output a transmission start signal when the detection signal matches a predetermined code.

12. The capacitive touch device as claimed in claim 10, wherein in the near field communication mode, the processing unit is further configured to control the capacitive touch device to output a response transmission data when the detection signal matches a predetermined code.

13. The capacitive touch device as claimed in claim 10, wherein when the near field communication mode is entered, the processing unit stops identifying a touch event according to the detection signal.

14. A mouse, comprising:
 a plurality of induction conductors configured to have different potential distributions at different time intervals by modulating respective potentials on the induction conductors after entering a near field communication mode, wherein the induction conductors have predetermined areas, a predetermined potential distribution before entering the near field communication mode and a predetermined arrangement to distinguish the mouse from other objects, a part of the plurality of induction conductors are further configured to send transmission data via a near field communication after the mouse receives a transmission start signal, and at least one of the plurality of induction conductors is configured to transmit clock data, and the induction conductor configured to send the transmission data is different from that configured to send the clock data.

15. The mouse as claimed in claim 14, wherein plurality of induction conductors are arranged at a bottom surface of the mouse.

16. The mouse as claimed in claim 14, wherein the modulating is to modulate at least one of an amplitude, a frequency and a phase of the potentials.

\* \* \* \* \*